United States Patent
Fukuma et al.

[11] Patent Number: 5,973,772
[45] Date of Patent: Oct. 26, 1999

[54] LAYOUT JUDGMENT APPARATUS AND LAYOUT JUDGMENT SYSTEM

[75] Inventors: Yasufumi Fukuma; Kouichi Matsumoto; Yukio Ikezawa; Eiichi Yanagi; Takeyuki Kato, all of Tokyo, Japan

[73] Assignee: Kabushiki Kaisha Topcon, Tokyo, Japan

[21] Appl. No.: 08/913,078

[22] PCT Filed: Jan. 9, 1997

[86] PCT No.: PCT/JP97/00026

§ 371 Date: Nov. 12, 1997

§ 102(e) Date: Nov. 12, 1997

[87] PCT Pub. No.: WO97/25647

PCT Pub. Date: Jul. 17, 1997

[30] Foreign Application Priority Data

Jan. 10, 1996 [JP] Japan ..................................... 8-002055

[51] Int. Cl.$^6$ ......................................................... G01B 9/00
[52] U.S. Cl. .............................................. 356/124; 33/200
[58] Field of Search .................................... 356/124–127, 356/376; 33/200, 28, 507; 351/204, 211

[56] References Cited

U.S. PATENT DOCUMENTS

| | | | |
|---|---|---|---|
| 5,428,448 | 6/1995 | Albert-Garcia | 356/376 |
| 5,825,476 | 10/1998 | Abitol et al. | 256/124 |
| 5,844,671 | 12/1998 | Kajino et al. | 356/124 |
| 5,847,819 | 12/1998 | Yanagi | 356/124 |

FOREIGN PATENT DOCUMENTS

| | | | |
|---|---|---|---|
| 0363281 | 4/1990 | European Pat. Off. | 356/124 |
| 0576268A1 | 12/1993 | European Pat. Off. | |
| 0583915A2 | 2/1994 | European Pat. Off. | |

OTHER PUBLICATIONS

Supplementary EPO Search Report dated Feb. 17, 1999.

*Primary Examiner*—Hoa Q. Pham
*Attorney, Agent, or Firm*—Finnegan, Henderson, Farabow, Garrett & Dunner, L.L.P.

[57] ABSTRACT

On a monitor (52) there is displayed a synthesized image (G4) in which an image (G1) of a subject lens showing a refractive power distribution, an image (G2) of a lens frame, and an eyepoint mark image (G3) are superimposed based on the refractive power distribution data of the subject lens by a lens meter (100), on the frame shape data of the lens frame by a frame shape measurement apparatus (200), and on the eyepoint data by an eyepoint measurement apparatus (300).

17 Claims, 36 Drawing Sheets

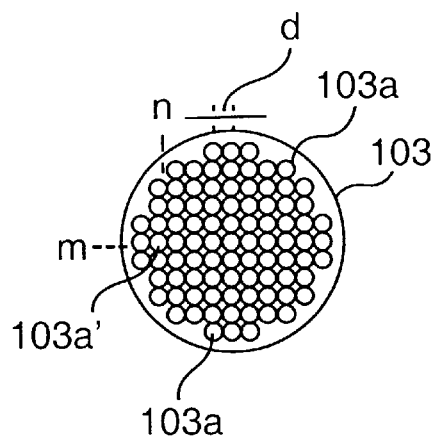
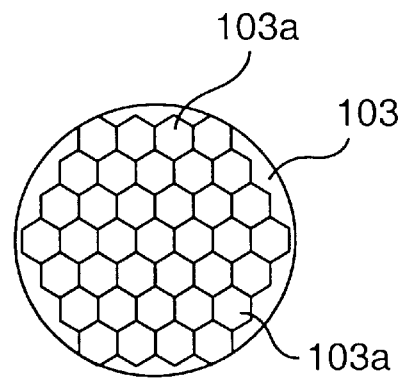
FIG. 4(A)  FIG. 4(B)
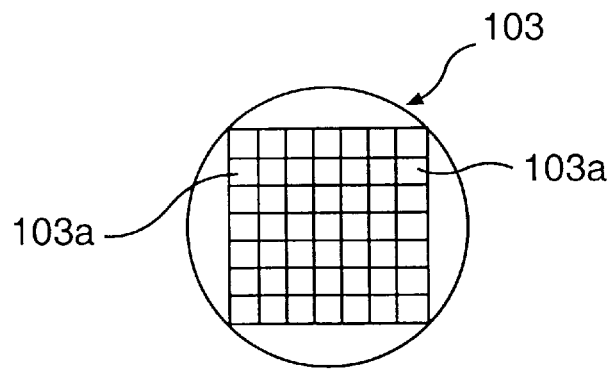
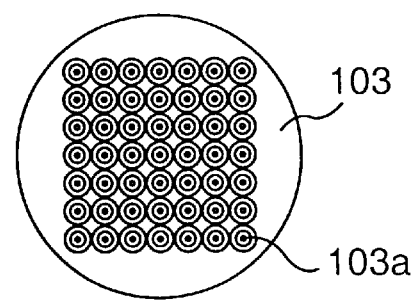
FIG. 4(C)  FIG. 4(D)

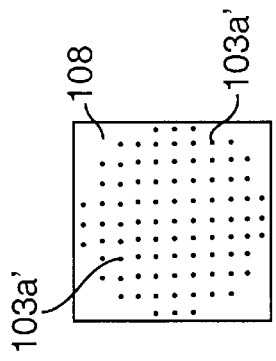
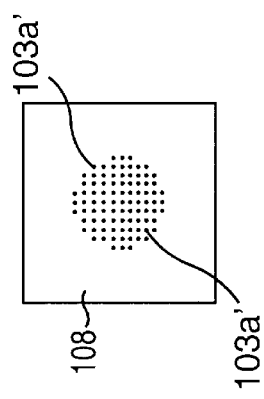
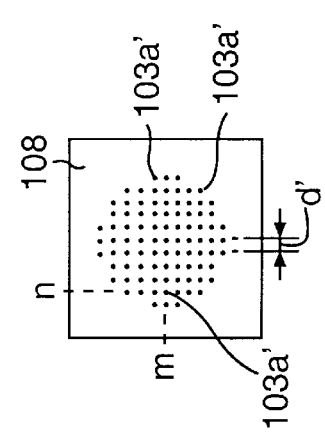
FIG. 5(A)  FIG. 5(B)  FIG. 5(C)
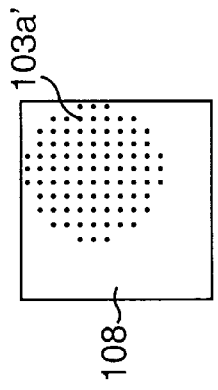
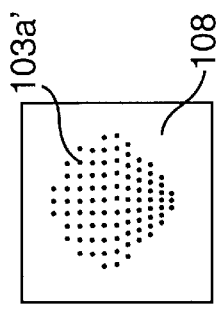
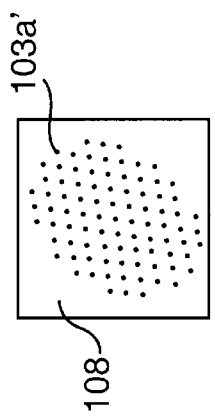
FIG. 5(D)  FIG. 5(E)  FIG. 5(F)
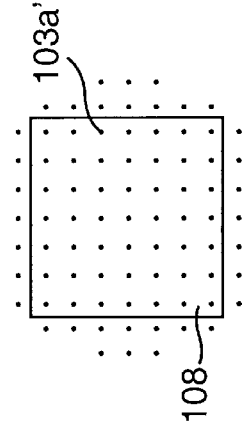
FIG. 5(G)

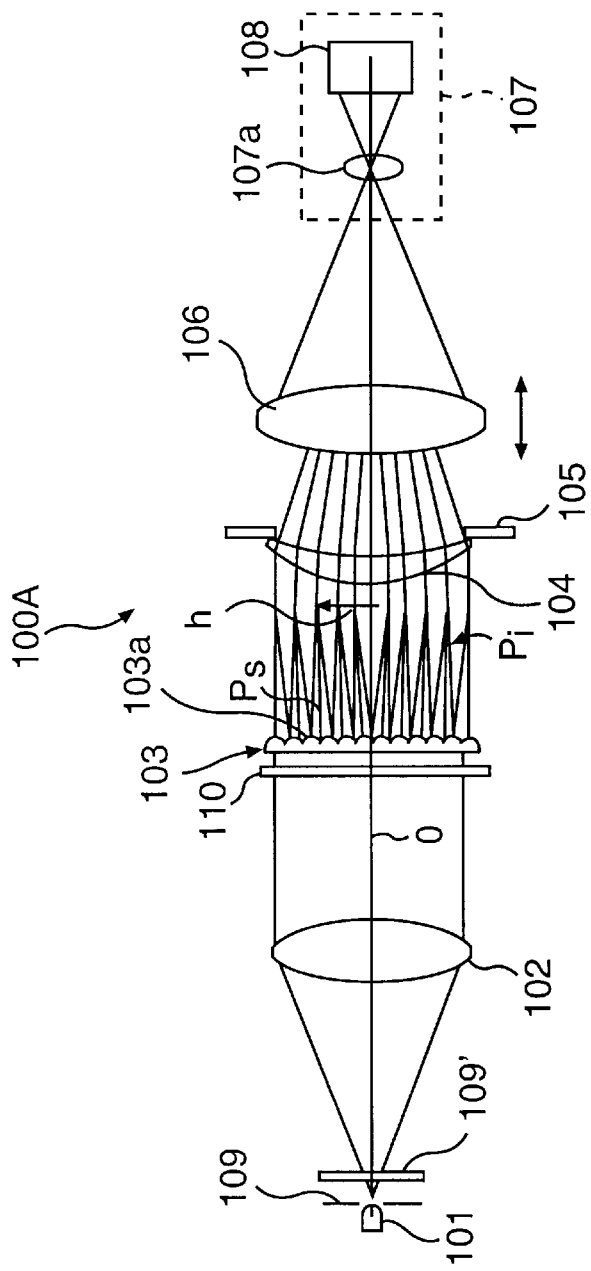
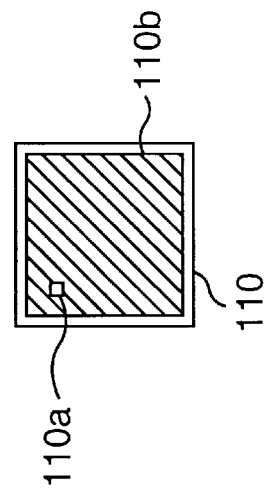
FIG. 8
FIG. 9

LAYOUT JUDGMENT APPARATUS AND LAYOUT JUDGMENT SYSTEM

BACKGROUND OF THE INVENTION

1. Field of the Invention

This invention relates to a layout judgment apparatus that judges the layout of a lens to be tested (hereinafter referred to as a subject lens) and a system for the layout judgment apparatus.

2. Description of the Related Art

Progressive power lenses and distance aspheric lenses have become widespread in recent years as eyeglass lenses. With this wide spread, there is a need to appropriately put an eyeglass lens into the lens frame of an eyeglass frame so that the distance visual point and near visual point of a subject fall within the lens frame. For this reason, there is a need to measure the lens characteristics of a subject lens with a lens meter and confirm the distance portion (i.e., farsighted portion) and near portion (i.e., nearsighted portion) of the subject lens.

The aforementioned conventional lens meter, however, merely displays the measured value of each portion measured with a means of measuring. For this reason, there arises the disadvantage that the corresponding relationship between the frame of a subject lens and the distribution state of the lens characteristics of the subject lens, that is, the layout of the lens characteristics of the subject lens to the lens frame, is not known.

SUMMARY OF THE INVENTION

This invention has been made in view of the aforementioned problem, and the object of the invention is to provide a layout judgment apparatus and a layout judgment system which are capable of judging the corresponding relationship between the distribution state of the lens characteristics of a progressive power lens and the lens frame.

This invention is equipped with a measurement means for measuring a lens characteristic of a subject lens and a display section for displaying an image of distribution which shows the measured lens characteristic, in order to achieve the aforementioned object. A lens frame image showing the shape of a lens frame is displayed on the display section.

According to the aforementioned structure of this invention, the lens characteristic of a subject lens is measured by the measurement means, and an image of distribution showing the measured lens characteristic is displayed on the display section. Also, a lens frame image showing the shape of a lens frame is displayed on the display section.

BRIEF DESCRIPTION OF THE DRAWINGS

FIG. 4(A) is a plan view showing a case where the microscopic lens of the micro lens array of FIG. 3 is a circular, spherical convex lens;

FIG. 4(B) is a plan view showing a case where the microscopic lens is a hexagonal, spherical convex lens;

FIG. 4(C) is a plan view showing a case where the microscopic lens is a rectangular, spherical convex lens;

FIG. 4(D) is a plan view showing a case where the microscopic lens is a Fresnel lens;

FIG. 5(A) is an explanatory diagram of light spot images formed on a light receiving sensor in the case where the subject lens has not been set;

FIG. 5(B) is an explanatory diagram of light spot images formed on a light receiving sensor in the case where the subject lens is a positive spherical lens;

FIG. 5(C) is an explanatory diagram of light spot images formed on a light receiving sensor in the case where the subject lens is a negative spherical lens;

FIG. 5(D) is an explanatory diagram of light spot images formed on a light receiving sensor in the case where the subject lens is a lens for astigmatism;

FIG. 5(E) is an explanatory diagram of light spot images formed on a light receiving sensor in the case where the subject lens is a progressive power lens;

FIG. 5(F) is an explanatory diagram of light spot images formed on a light receiving sensor in the case where the subject lens is eccentric and a prism;

FIG. 5(G) is an explanatory diagram of light spot images formed on a light receiving sensor in the case where the subject lens is a negative spherical lens with a strong degree;

FIG. 8 is an optical layout diagram showing the optical system of the lens meter of a second embodiment;

FIG. 9 is a plan view of a liquid crystal shutter;

FIG. 17(B) shows a shape example of the rear surface of the subject lens obtained by the three-dimensional shape measurement apparatus;

FIGS. 26(a)(ii) through (c)(ii) are explanatory diagrams of the state of inclination between a subject lens and the lens frame;

DETAILED DESCRIPTION OF THE PREFERRED EMBODIMENTS

Embodiments of a layout judgment apparatus and a layout judgment system for a lens to be processed, according to the present invention, will hereinafter be described based on the drawings.

First Embodiment

Figure 1:
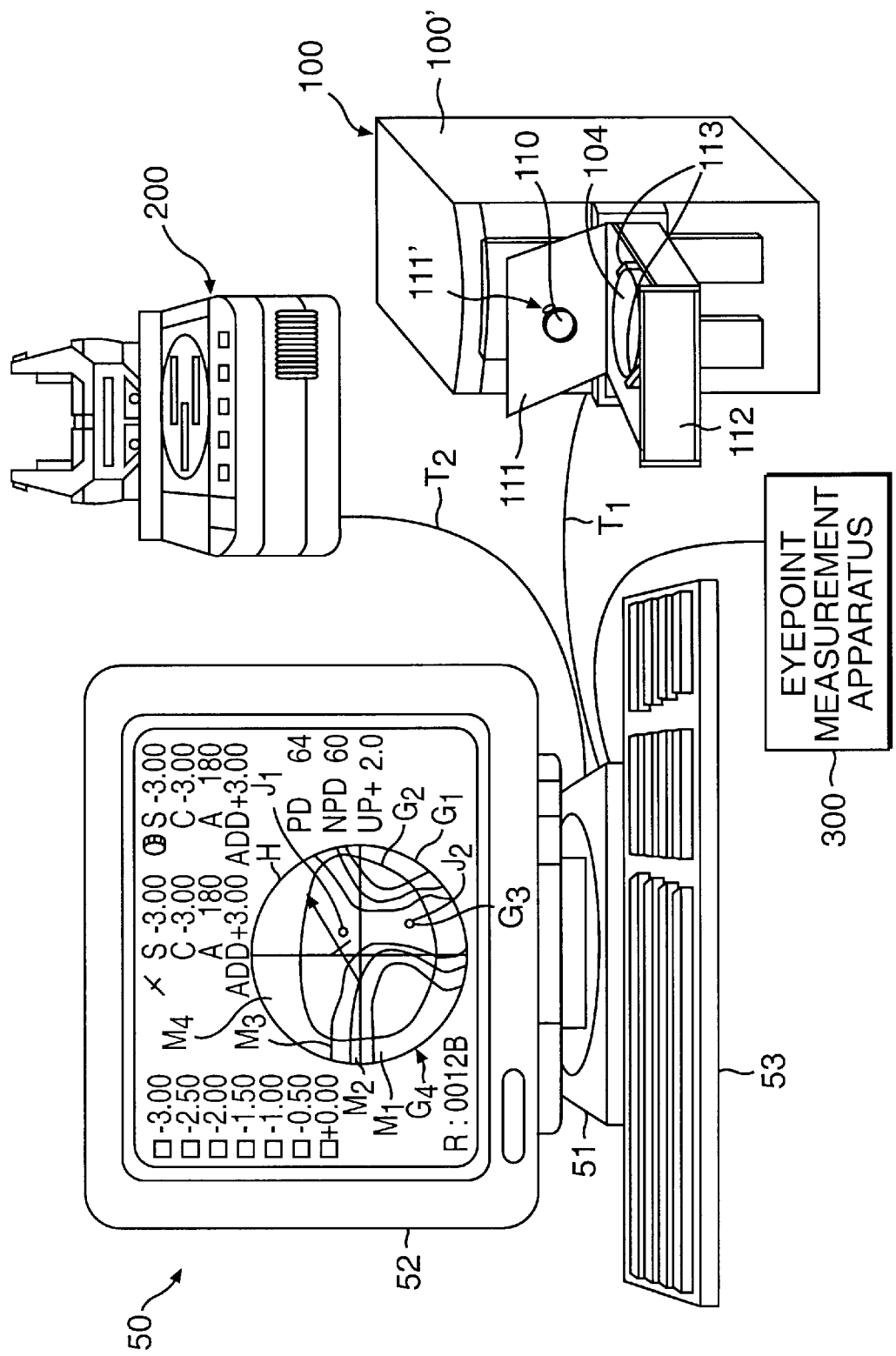
FIG. 1 is a perspective view showing a layout judgment system for a subject lens according to this invention.

FIG. 1 shows a layout judgment system. This layout judgment system has a judgment apparatus 50 installed, for example, in eyeglass stores. This judgment apparatus 50 comprising a personal computer (PC) has a main body 51, a monitor (image display means) 52, and a keyboard 53.

Figure 2:
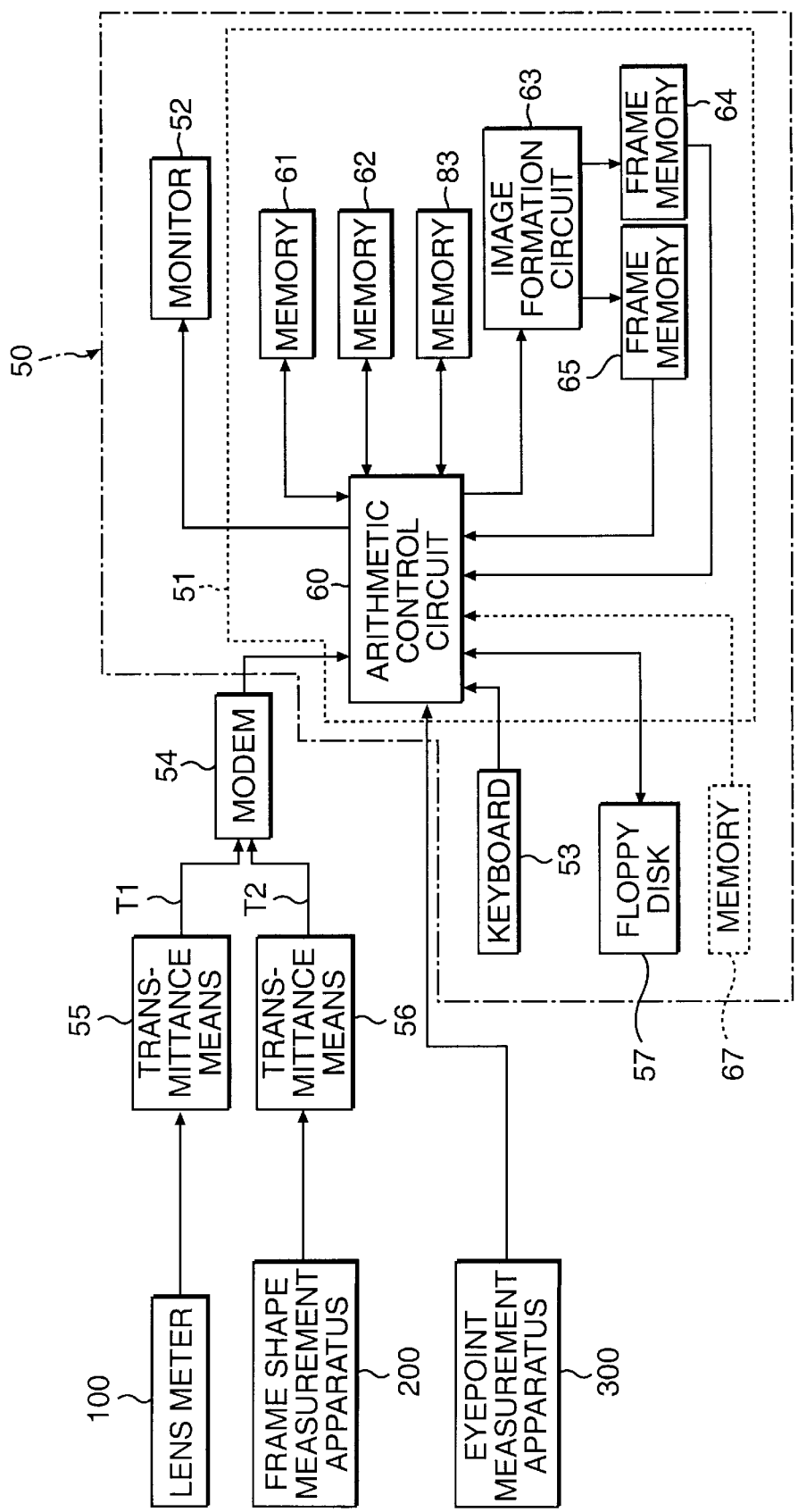
FIG. 2 is a block diagram showing a structure of the layout judgment system of FIG. 1.

The main body 51 is connected to a lens meter 100 and a frame shape measurement apparatus 200 through a modem (lens data input means and frame data input means) 54, communication lines T1 and T2, and transmission means (modems) 55 and 56 (see FIG. 2). Furthermore, the main body 51 is connected to an eyepoint measurement apparatus 300. The lens meter 100 is installed in a lens maker, the frame shape measurement apparatus 200 is installed in a frame maker, and the eyepoint measurement apparatus 300 is installed in eyeglass stores. And, the layout judgment system is made up of the judgment apparatus 50, the lens meter 100, the frame shape measurement apparatus 200, and the eyepoint measurement apparatus 300.

The main body 51, as shown in FIG. 2, is provided with an arithmetic control circuit 60 consisting of a central processing unit (CPU), a memory 61 for storing the refractive power distribution data of a subject lens read out of a floppy disk 57, a memory 62 for storing the frame shape data of a lens frame read out of the floppy disk 57, and a memory 83 for storing eyepoint data measured by the eyepoint measurement apparatus 300. The main body 51 also is provided with an image formation circuit 63 for forming, based on data stored in the memories 61, 62, and 83, a lens image G1 of a subject lens showing a refractive power distribution, a frame image G2 of a lens frame, and an eyepoint mark image G3 showing an eyepoint position with respect to the frame image G2. The main body 51 is further provided with a frame memory 64 for storing the aforementioned lens image G1 and a frame memory 65 for storing the aforementioned frame image G2 and eyepoint mark image G3.

Also, the main body 51 is provided with a store/read unit (not shown) which stores information on the floppy disk 57 or reads out the stored information from the floppy disk 57. The floppy disk 57 stores the refractive power distribution data of a subject lens measured with the lens meter 100 and the frame shape data measured with the frame shape measurement apparatus 200 in correspondence with lens classification numbers and frame type numbers, respectively.

The arithmetic control circuit 60 synthesizes the lens image G1, the frame image G2, and the eyepoint mark image G3, stored in the frame memories 64 and 65, and causes the monitor 52 to display this synthesized image G4. The arithmetic control circuit 60 also causes the floppy disk 57 to store the refractive power distribution data and the frame shape data of a subject lens which are input through the modem 54.

The lens meter 100 is made up of a box 100' with a built-in optical system, a drawer portion 112 which is provided in the box 100' so that the drawer portion 112 can be put in and out of the box 100' and in which a subject lens 104 is mounted, a cover portion 111 provided on the drawer portion 112 so that the cover portion 111 can be opened and closed, and a suction disc attaching portion 111' provided on the cover portion 111.

The drawer portion 112 is provided with three clamping members 113 which clamp the subject lens 104 by clamping the edge surface of the subject lens 104 from three directions.

A suction disc 110 is detachably attached to the suction disc attaching portion 111' so as to be positioned on the optical axis of the subject lens 104. By only closing the cover portion 111, the suction disc 110 can be attached onto the geometric center of the subject lens 104.

The frame shape measurement apparatus 200 is equipped with a measuring section (not shown) which digitally measures the shape of the lens frame of an eyeglass frame or the shape of a rimless lens. This measuring section has both a measurer (not shown) and a lens feeler (not shown).

The measuring section moves the measurer along a V-shaped groove of a lens frame, and measures the shape of the lens frame by measuring the quantity of movement of the measurer at this time. Also, the measuring section moves the lens feeler along the circumferential edge of a rimless lens while bringing the lens feeler into contact with the circumferential edge, and measures the shape of the rimless lens by measuring the quantity of movement of the lens feeler at this time.

Figure 3:
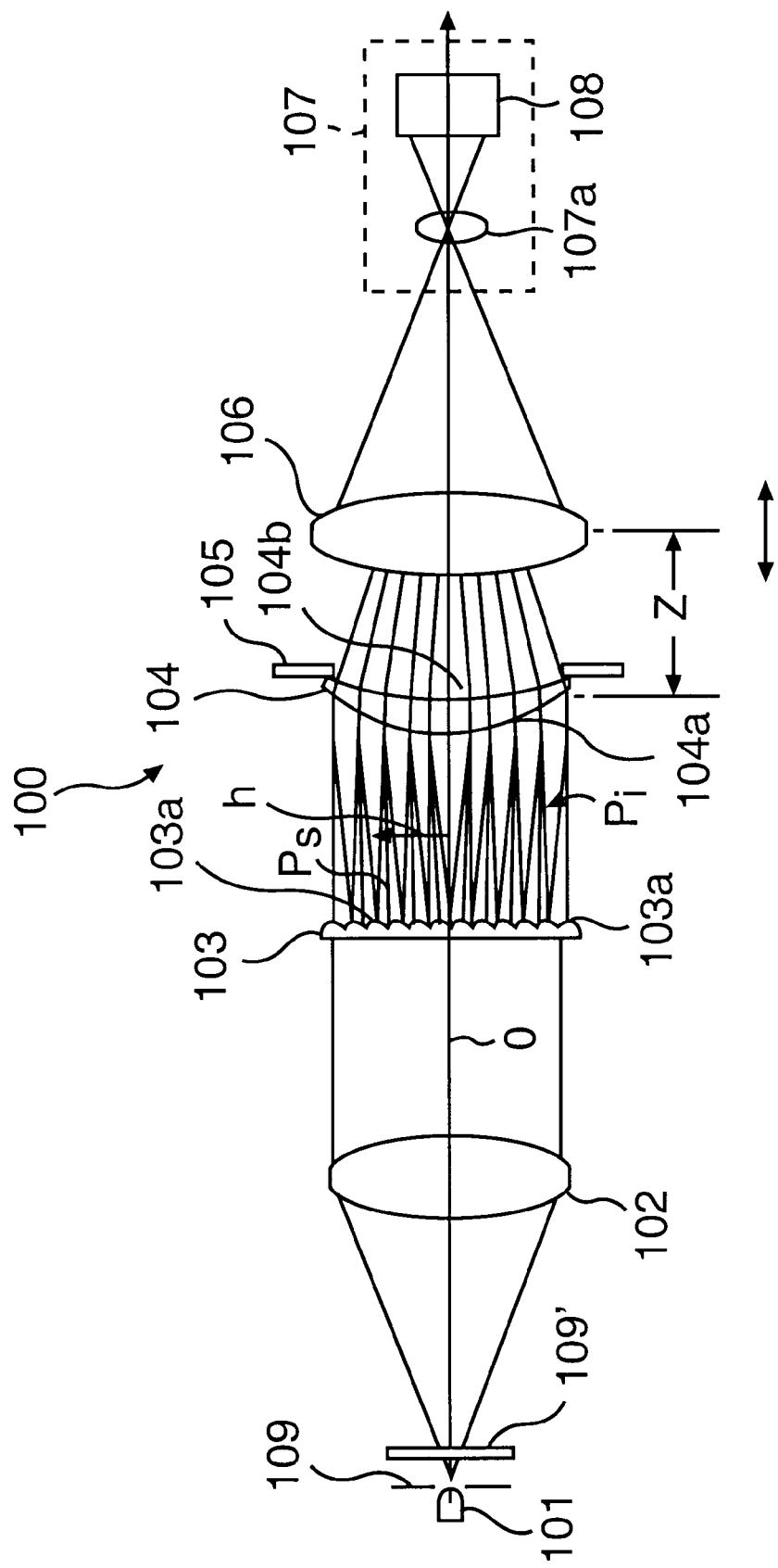
FIG. 3 is an optical layout diagram showing an optical system of the lens meter.

FIG. 3 shows an optical system of the lens meter 100. In the figure, reference numeral 101 is a light source consisting of a tungsten lamp, 102 a collimator lens, 103 a micro lens array, 104 a subject lens, 105 a lens receiver, 106 a relay lens, 107 a CCD camera, 107a a lens of the CCD camera 107, and 108 an area CCD of the CCD camera 107. A diaphragm 109 and a filter 109' are provided immediately in front of the tungsten lamp 101. The tungsten lamp 101, the diaphragm 109, the filter 109', and the collimator lens 102 constitute a great number of light source portions by the micro lens array 103.

The filter 109' transmits light of a wavelength near an e-ray and filters out light other than an e-ray. Light emitted from the tungsten lamp 101 is made into a nearly collimated beam of light by the collimator lens 102 and is guided to the micro lens array 103. This micro lens array 103 has a great number of microscopic lenses 103a two-dimensionally arranged. This microscopic lens 103a may also be a spherical lens such as the one shown in FIG. 4(A) or a lens making use of a diffraction effect such as the one shown in FIG. 4(D). The external form of the microscopic lens 103a may also be any circle such as the one shown in FIG. 4(A), any hexagon such as the one shown in FIG. 4(B), or any rectangle such as the one shown in FIG. 4(C).

The microscopic lenses 103a have nearly the same focal distance. The number of the microscopic lenses 103a is about 1000, and based on the collimated light beam, condensed light beams Pi equivalent to this number are generated. The subject lens 104 is positioned near the back focal position of the micro lens array 103. Here, the front surface 104a of the subject lens 104 is referred to as a surface on a side far away from an eye when worn in the case where the subject lens 104 means an eyeglass lens. The rear surface 104b of the subject lens 104 is referred to as a surface on a side near to an eye when worn in the case where the subject lens 104 means an eyeglass lens. When manufacturing eyeglass lenses, a mark point is put on the front surface 104a.

A light source image corresponding to the microscopic lens 103a is formed on the subject lens 104. Each light beam Pi transmitted through this subject lens 104 is guided to the lens 107a of the CCD camera 107 through the relay lens 106 and is imaged on the light receiving lens 108 consisting of a CCD. The principal ray Ps of the condensed light beams from each microscopic lens 3a which is incident upon the subject lens 104 is parallel to an optical axis O. This principal ray Ps is deflected after transmitted through the subject lens 104, and the degree of deflection is determined by both an incident height h (which is the incident position of the principal ray Ps of the front surface 104a of the subject lens 104) and the degree of the subject lens 104 at that incident position.

The degree S (unit: diopter) at each point of the surface 104a is given as follows:

$$S = \tan\theta/(10h) \tag{1}$$

where θ is the angle of deflection of the principal ray Ps after transmission.

Since the height of the principal ray Ps based on each microscopic lens 103a is known, the following equation is obtained.

$$\theta = \tan^{-1}\{(h-\beta hi)Z\} \tag{2}$$

where hi is the height on the light receiving sensor 108, β is the relay magnification, and Z is the distance from the sear surface 104b of the subject lens 104 to the relay lens 106.

Therefore, if the unknown height hi on the light receiving sensor 108 is obtained, then the angle of deflection θ will be obtained. Consequently, the degree S is finally obtained by Eq. (1).

For example, in the case where the subject lens 104 has not been set to the lens receiver 105, each light spot image 103a' corresponding to each microscopic lens 103a is formed on the light receiving sensor 108 as shown in FIG. 5(A).

In the case where the subject lens 104 has a positive spherical degree with the spacing d' between the light spot images 103a' shown in FIG. 5(A) as a reference, light spot images 103a' having a smaller spacing than the spacing d' are formed on the light receiving sensor 108 as shown in FIG. 5(B). Where and the subject lens 104 has a negative spherical degree, light spot images 103a' having a larger spacing than the spacing d' are formed as shown in FIG. 5(C). Where and the subject lens 104 is a lens for astigmatism, the entire configuration of the light spot images 103a', which are formed by the microscopic lenses 103a arranged in the vertex positions of a square as a whole as shown in FIG. 4(A), presents the shape of a distorted parallelogram as shown in FIG. 5(D).

In the case where the subject lens 104 is a progressive power lens, the light spot images 103a' are formed as a combination of FIGS. 5(B) and 5(D) and, in the near portion, the images will be closer to each other downward, as shown in FIG. 5(E). In the case where the subject lens 104 is eccentric and the case where the subject lens 104 is a prism, the entire configuration of the light spot images 103a' is offset from the center of the light receiving sensor 108 as shown in FIG. 5(F). Where and the subject lens 104 is a negative lens with a strong degree, the spacing between the light spot images 103a' becomes wider and the light spot images 103a' on the peripheral portion overflows the light receiving sensor 108, as shown in FIG. 5(G).

Where and the power of the subject lens 104 is great, in other words, in the case where the focal distance of the subject lens 104 is short, if the spacing (inter lens distance) "d" between the centers of microscopic lenses 103a (see FIG. 4(A)) is made larger and the density of microscopic lenses 103a per unit area is made smaller, or if the relay lens 106 is arranged in close vicinity to the subject lens 104 (if the relay lens 106 is constructed so as to be movable along the optical axis O and is arranged in close vicinity to the subject lens 104), then one condensed light beam Pi and another condensed light beam Pi can be guided onto the light receiving sensor 108 without crossing each other. For example, the condensed light beam on the (n, m)th microscopic lens 103a shown in FIG. 4(A) can be caused to reliably correspond to the (n, m)th position of the light receiving sensor 108 shown in FIG. 5(A). Since the spacing "d" between the microscopic lens 103a is a known value, the incident positions (heights h) on the front surface 104a of the subject lens 104 could be known even if a plurality of light beams were simultaneously incident upon the light receiving sensor 108. That is, by constructing the relay lens 106 so that it is movable along the optical axis O, the dynamic range becomes wider.

Then, the degree distributions M1 through M4 of the subject lens 104, the optical axis, and the axial direction of the astigmatism are obtained by obtaining the degree S at each point of the front surface 104a. Also, the projected image of the subject lens 104 can be imaged onto the light receiving sensor 108 by setting the micro lens array 103 so as to be larger than the diameter of the subject lens 104. From this projected image the size of the external form of the subject lens 104 is obtained.

Figure 21:
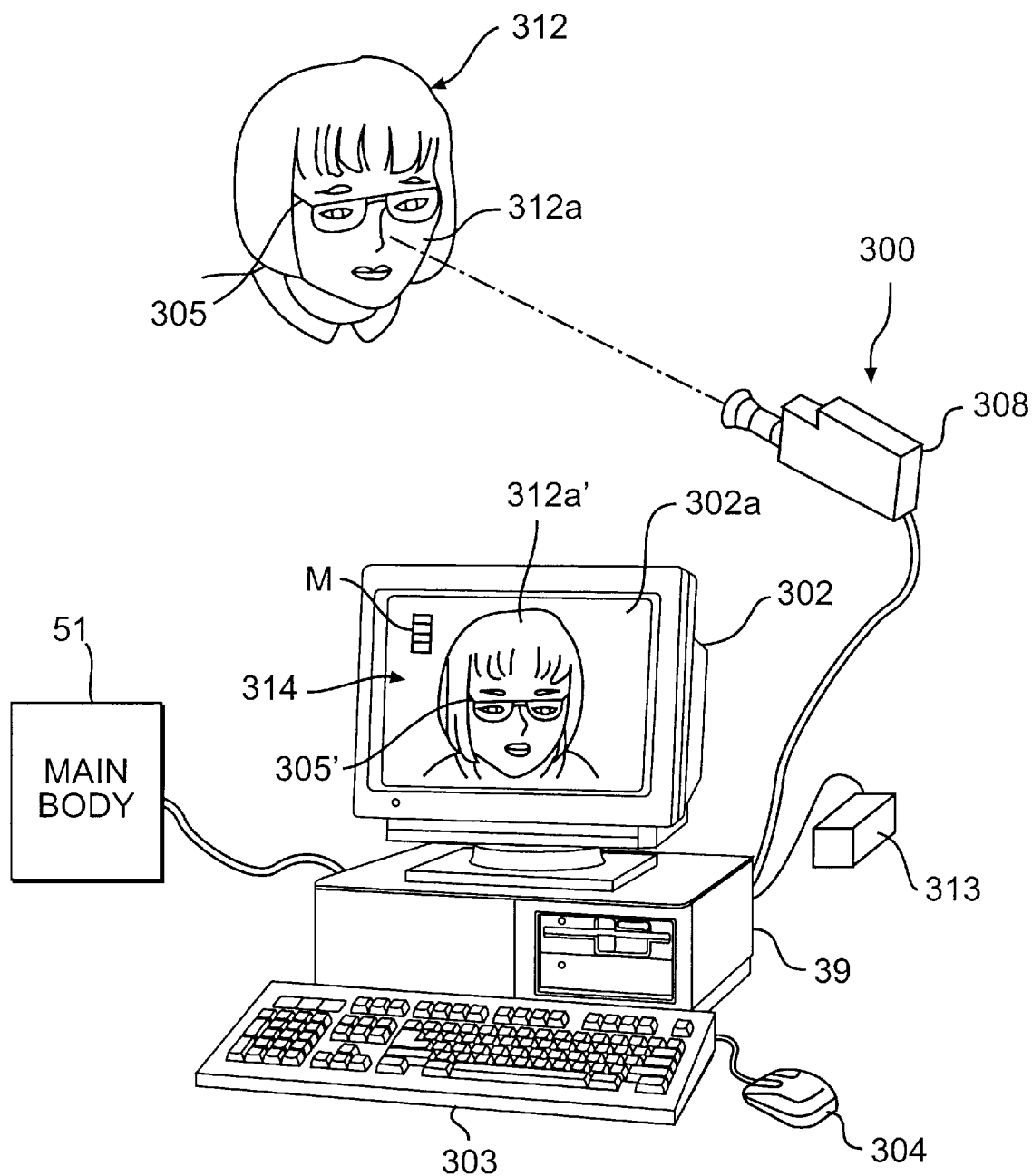
FIG. 21 is an explanatory diagram showing a structure of the eyepoint measurement apparatus.

The eyepoint measurement apparatus 300, as shown in FIG. 21, has a PC's main body 301 with an arithmetic control circuit 301a (see FIG. 22), a monitor television 302 connected to the arithmetic control circuit 301a of the main body 301 of the PC, a keyboard 303, and the like. Reference numeral 304 is a mouse connected to the main body 301 of the PC.

Figure 22:
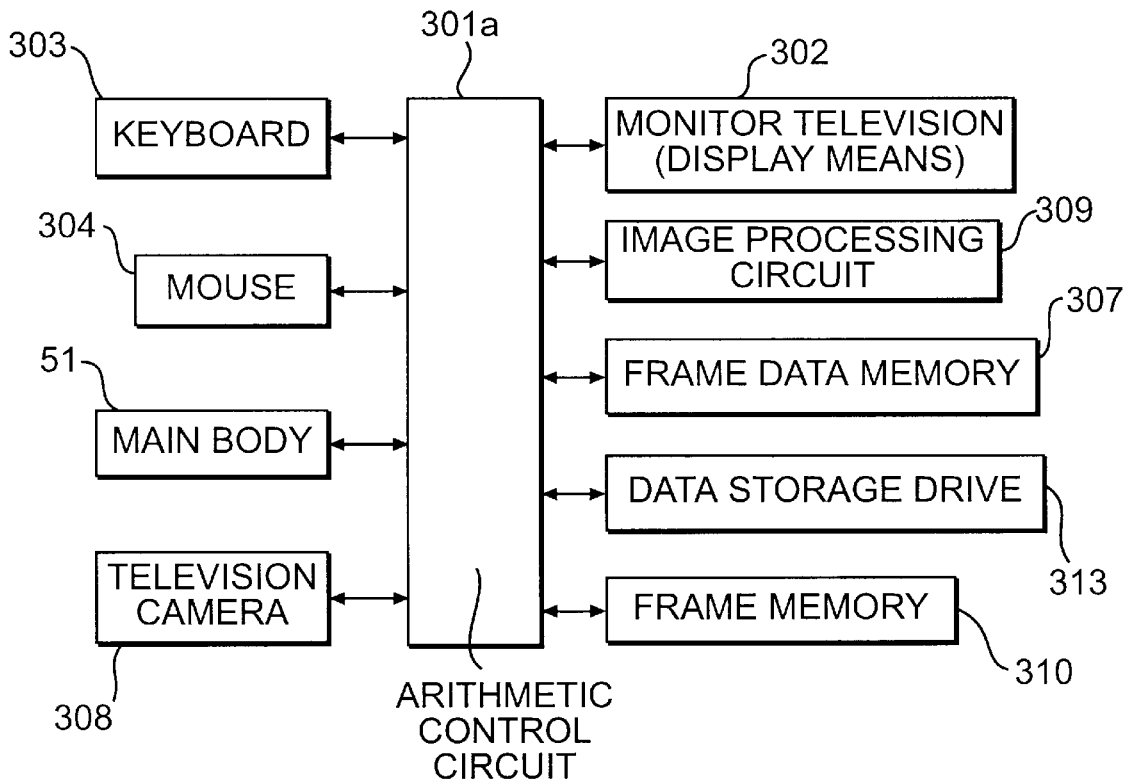
FIG. 22 is a block diagram showing a structure of the control system of the eyepoint measurement apparatus.

As shown in FIG. 22, the main body 51 (see FIG. 1), a frame data memory 307, a television camera 308, an image processing circuit 309, and frame memory 310 are connected to the aforementioned arithmetic control circuit 301a.

The frame data memory 307 stores the measured data of the frame shape of the lens frame 305a of an eyeglass frame 305 read out from the floppy disk 57 (see FIG. 2).

Figure 23:
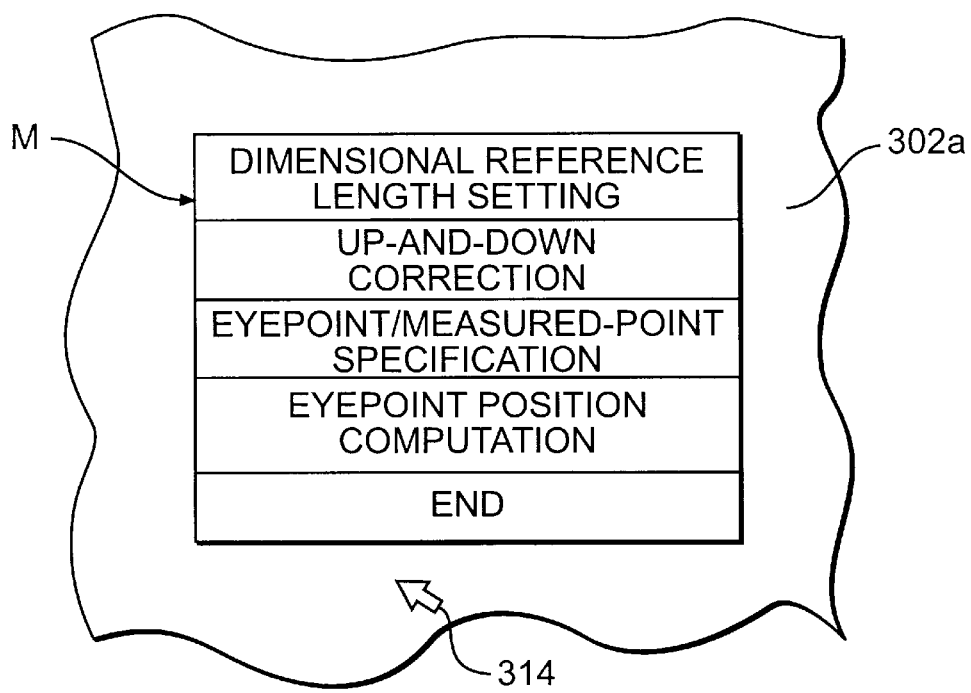
FIG. 23 is an explanatory diagram showing on an enlarged scale the menu section on the screen of the monitor television of FIG. 21.
Figure 24:
FIG. 24 is an explanatory diagram showing on an enlarged scale the image of a face on the monitor television of FIG. 21.

The television camera 308 photographs the face 312a of a customer 312, and a video signal from the television camera 308 is input to the arithmetic control circuit 301a. This arithmetic control circuit 301a generates the digital image data of the face 312a based on the video signal through the image processing circuit 309 and transmits the digital image data to the frame memory 310. Also, the arithmetic control circuit 301a displays the face image 312a' on the screen 302a of the monitor television 302, as shown in FIG. 24. At the same time, the arithmetic control circuit 301a displays on the monitor television 302 a menu M consisting of "Dimensional reference length setting," "Up-and-down correction," "Eyepoint/measured-point specification," "Eyepoint position computation," and so on, as shown in FIG. 23. In FIGS. 21 and 22, reference numeral 313 denotes a data storage drive, such as a hard-disk drive or a magneto-optical disk drive, connected to the arithmetic control circuit 301a.

The operation of structure such as this will next be described.

The face 312a of the customer 312 is first photographed with the television camera 308. With this photographing, the face image 312a' is on the screen 302a of the monitor television 302, as shown in FIG. 21.

Figure 26A:
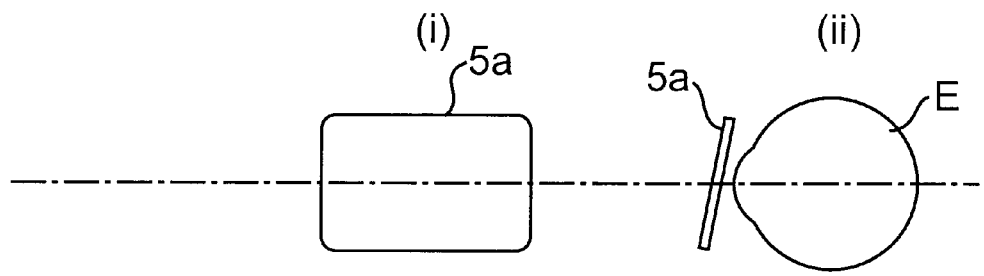
FIGS. 26(a)(i) through 26(c)(i) are explanatory diagrams of a lens frame in front view.
Figure 26B:
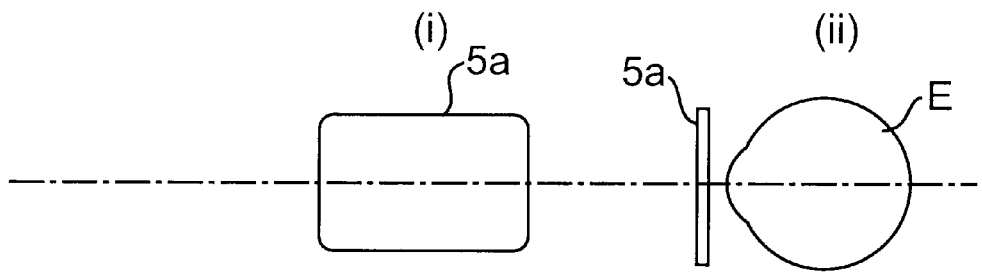
Figure 26C:
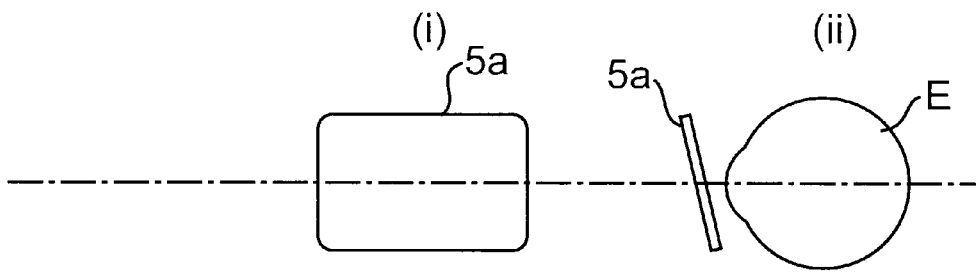

Here, in the case where the face 312a of the customer 312 is photographed with the television camera 308, the face 312a is usually opposed to the television camera 308 and there is a small possibility that the face 312a is inclined right and left. However, the lens frame 305a of an eyeglass frame 305 worn on the face 312a is in a state of upward inclination, no inclination, or downward inclination as shown in FIGS. 26(a)(ii) through (c)(ii), depending upon the position or height of the nose of the customer 312, even when the face 312a of the customer 312 is frontally oriented and the direction of a subject eye E is frontally oriented. In many cases, particularly, the lens frame 305a takes the states of (a) and (c). In such cases, as shown in FIGS. 26(a)(i) through (c)(i), since the up-and-down dimension of the lens frame 305a viewed at the front of the lens frame 305a becomes smaller than that of FIG. 26(b)(i), the following reference setting and correction will become effective.

(1) Reference Length Setting

Figure 25A:
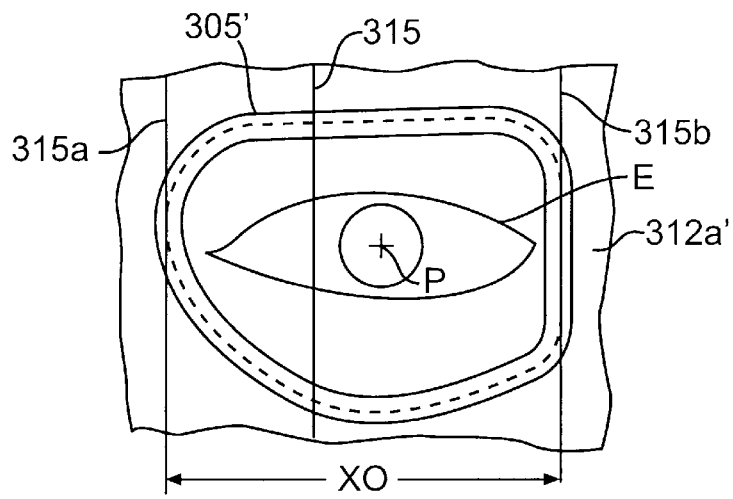
FIGS. 25(a) through 25(c) are explanatory diagrams for up-and-down inclination correction.
Figure 25B:
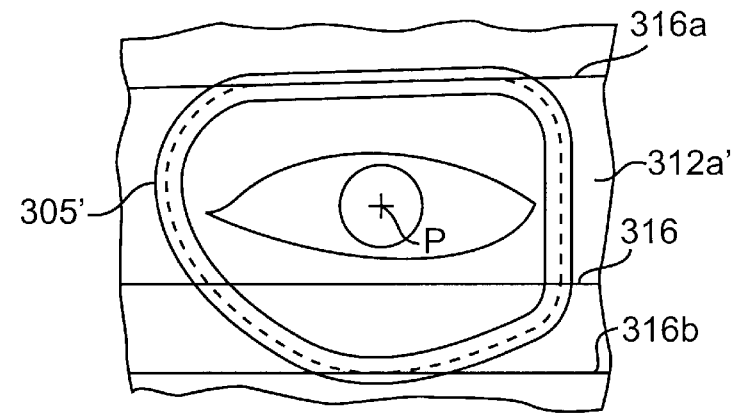
Figure 25C:
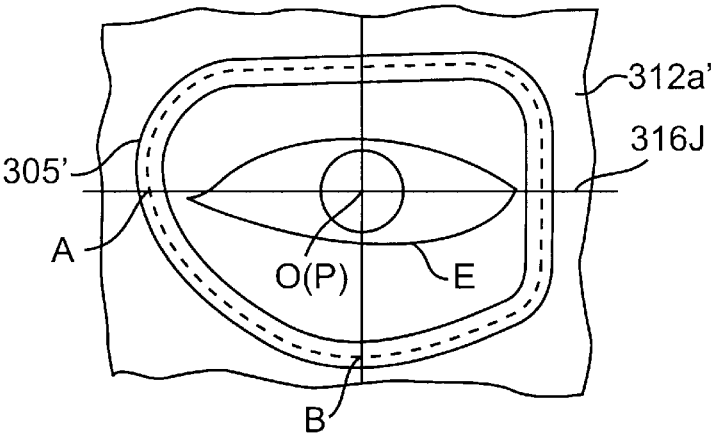

Select the "Dimensional reference length setting" by manipulating a cursor key of the keyboard 303 or the mouse 304. With this selection, a vertical line 315 is displayed onto the monitor television 302 as shown in FIG. 25 and a dimensional reference length setting mode is set. Then, the vertical line 315 is aligned with the center of one of the rightmost and leftmost ends of the rim of a frame image 305' by manipulating the keyboard 303 or the mouse 304, and the vertical line 315 is fixed and displayed as a reference specifying line 315a. Thereafter, the vertical line 315 is aligned with the center of the other of the rightmost and leftmost ends of the rim of the lens frame image 305a' by moving the vertical line 315 with the keyboard 303 or the mouse 304, and the vertical line 315 is fixed as a reference specifying line 315b.

If the reference specifying lines 315a and 315b are set, the arithmetic control circuit 301a will set the distance between the reference specifying lines 315a and 315b on the monitor television 302 to a reference length X1 and set the distance between the right and left ends of the measured data of the frame shape stored in the frame data memory 307 to X0.

(2) Up-and-Down Correction

Next, select the "Up-and-down correction" with manipulating the cursor key of the keyboard 303 or the mouse 304. With this selection, a horizontal line 316 is displayed onto the monitor television 302 and the dimensional reference length setting mode is set.

Then, the horizontal line 316 is aligned with the center of one of the uppermost and lowermost ends of the rim of the lens frame image 305a' by manipulation of the keyboard 303 or the mouse 304, and the horizontal line 316 is fixed and displayed as a specifying line 316a. Thereafter, the horizontal line 316 is aligned with the center of the other of the uppermost and lowermost ends of the rim of the lens frame image 305a' by moving the horizontal line 316 with the keyboard 303 or the mouse 304, and the horizontal line 316 is fixed as a specifying line 316b.

If the specifying lines 316a and 316b are set, the arithmetic control circuit 301a will set the distance between the right and left ends of the measured data of the frame shape stored in the frame data memory 307 to X0 and set the distance between the upper and lower ends of the measured data of the frame shape stored in the frame data memory 307 to Y0, and a ratio of distances Y0 and X0 (X0/Y0) will be obtained.

If the face of a customer is now opposed to the front surface of the television camera 308, the face will be in the state where the distances from the camera to the right and left ends of the frame are the same and also the right-and-left direction is not inclined back and forth. That is, there is no distortion in the aforementioned reference length X1 (distance between the reference specifying lines 315a and 315b).

On the other hand, the height or shape of the nose of a customer is different from person to person. Therefore, when the nose pad of the eyeglass frame 305 is put on the nose, it is also conceivable that the lens frame 305a of the eyeglass frame 305 is inclined back and forth, depending upon persons. In addition, it is conceivable that the up-and-down direction of the face of a customer is inclined back and forth and therefore the lens frame of an eyeglass frame is inclined back and forth.

In such a case, if the distance between the upper and lower ends of the lens frame 305a of the eyeglass frame 305 on the monitor television 302 is taken to be Y1, the ratio (X1/Y1) between distance Y1 and reference length X1 (distance between reference specifying lines 315a and 315b) will differ from the aforementioned ratio (X0/Y0). In other words, in the case where the ratio (X1/Y1) differs from the ratio (X0/Y0), it can be judged that the up-and-down direction of the lens frame 305a of the eyeglass frame 305 has been inclined back and forth.

Therefore, the ratio (Y1/Y0) is distorted with respect to the ratio (X1/X0), by the ratio (X1/X0) between reference length X1 and distance X0 and the ratio (Y1/Y0) between distance Y1 and distance Y0. That is, the ratio (X1/X0) win become equal to Q times (Y1/Y0).

As a result, the ratio (X1/X0) becomes as follows:

$$(X1/X0)=(Y1/Y0) \cdot Q$$

From this relationship, the correction magnification, that is, the correction rate Q is obtained as:

$$Q=X1 \cdot Y0/X0 \cdot Y1$$

$$=(X1 \cdot Y0/X0) \cdot (1/Y1)$$

Hence, if the distance between two measured points on the monitor television 302 in the up-and-down direction is taken to be R, the actual length L1 after correction of the distortion of inclination of the distance R will be obtained as:

$$L1=R \cdot Q$$

(3) Measured Point Specification (Eyepoint Specification)

Thereafter, select the "Eyepoint/measured-point specification" by manipulation of the keyboard 303 and the mouse 304. With the selection, the measured point specifying mode is set, and a cross line 316J is displayed onto the monitor television 302. In this state the center 0 of the cross line 316J is aligned in sequence with the eyepoint P (distance visual point) of the subject eye image E' of the face image 312a', the measured point A of the leftmost end of the lens frame image 305a', and the measured point B of the lowermost end, by moving the cross line 316J. Then, at these positions shown in FIG. 25(c), the eyepoint P, the measured point A, and the lower measured point B are specified by manipulation of the keyboard 303 or the mouse 304.

(4) Inter Measured-Point Distance Computation

After the eyepoint P and the measured points A and B have been specified in the aforementioned way, select the "Eyepoint position computation" by manipulation of the keyboard 303 or the mouse 304. With this selection, computation is started.

Here, there is no distortion in a right-and-left direction, so if the distance between the eyepoint P and the measured point A is taken to be SX, the actual distance between the eyepoint A and the measured point A can be obtained as RX=SX·(X0/X1) from (X1/X0)=(SX/RX).

In addition, since there is distortion (error) in the inclination of the lens frame in the up-and-down direction, if the distance between the eyepoint P and the measured point B is taken to be R, the actual distance L1 will be obtained as $$L1=R \cdot Q$$

in view of the aforementioned correction magnification (dimension rate), that is, correction rate Q.

That is, the distance visual point P is to be obtained on the basis of the measured points A and B.

Next, a description will be made of the measurement of the near visual point Pk.

Figure 27:
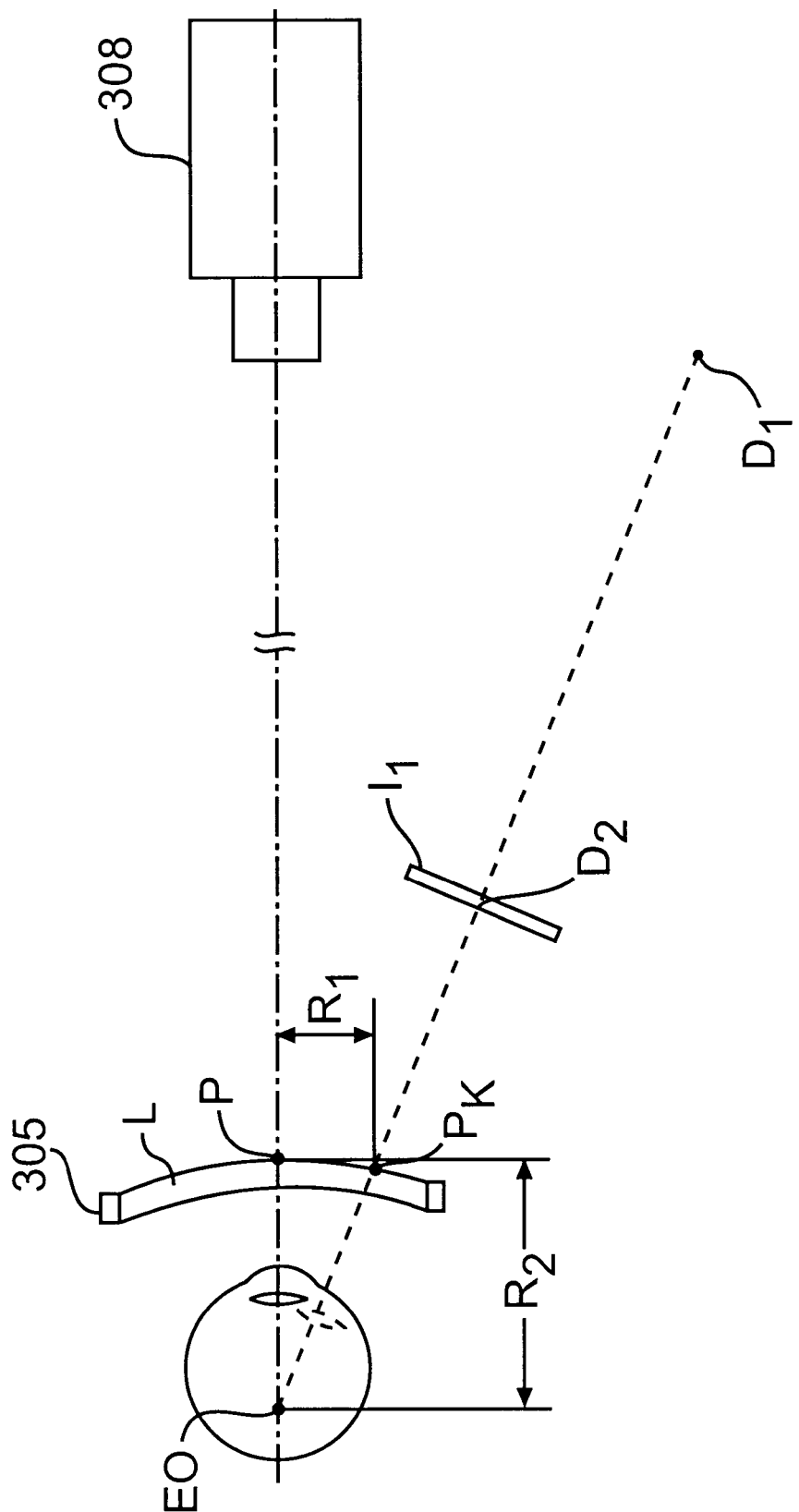
FIG. 27 is an explanatory diagram showing how a near visual point is measured.

As shown in FIG. 27, the distance R1 between the distance visual point P and the near visual point Pk is about 16 mm to 20 mm and the distance R2 from the rotational point E0 of an eye-ball to lens L is normally 25 mm. Additionally, in the case where the television camera 308 was installed, for example, at a position about 3 m away from customer 314 and the distance visual point P was measured, when the near visual point Pk is measured, a near target (a book, a newspaper, etc.) is placed onto a broken line, linking the position D1 moved 1.9 m to 2.4 m in parallel in a downward direction from a position indicated by a solid line and the rotational point E0 together, and also at a position D2 approximately 30 cm away from the lens L.

Figure 28:
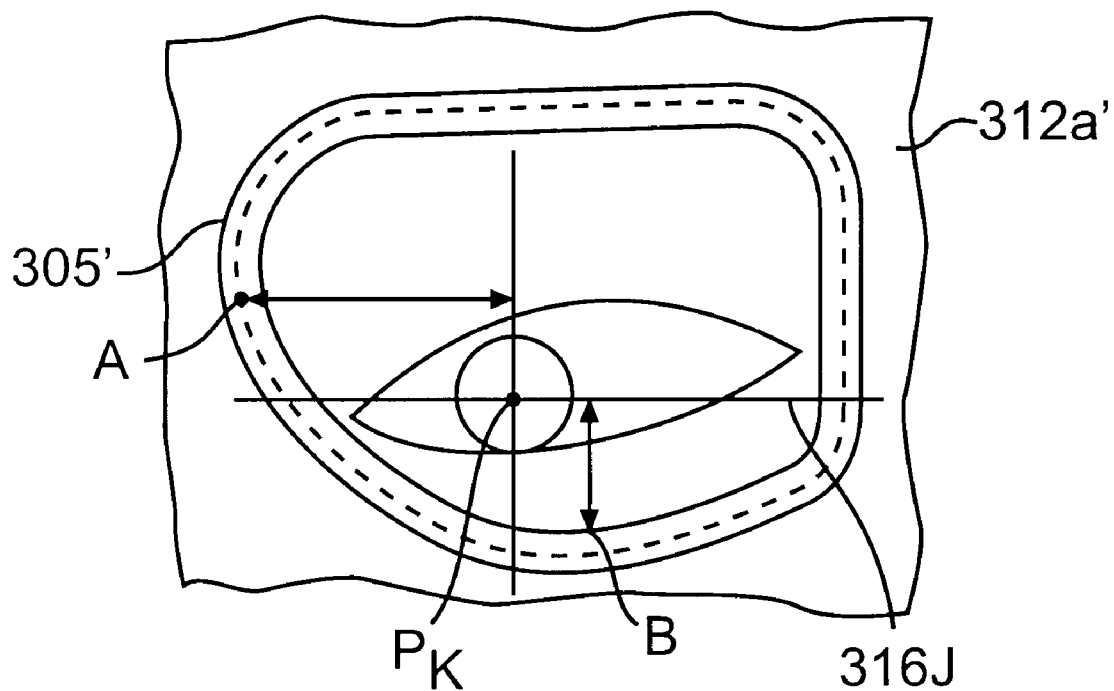
FIG. 28 is an explanatory diagram showing on an enlarged scale the image of a face displayed on a television monitor when photographed at the alternate long and short dash line position of FIG. 27.

Next, the visual point alone is oriented toward the near-target television camera 308 with the face of customer 314 oriented just frontally, and the face 312a of the customer 312 is photographed with the television camera 308. With this photographing, a face image 312a' is on the screen 302a of the monitor television 302, as shown in FIG. 28. Then, in the same way as the aforementioned, after setting the reference specifying lines 315a and 315b and the specifying lines 316a and 316b, the center 0 of the cross line 316J is aligned in sequence with the eyepoint Pk (near visual point) of the subject eye image E' of the face image 312a', the measured point A of the leftmost end of the lens frame image 305a', and the measured point B of the lowermost end. With this aligning operation, the eyepoint Pk, the measured point A, and the low measured point B are specified. Therefore, in the same way as the aforementioned, the near visual point Pk is to be obtained on the basis of the measured points A and B.

The data of the measured distance visual point P and the data of the measured near visual point Pk are transmitted to the main body 51.

The operation of the aforementioned first embodiment will next be described.

If a lens maker manufactures a new subject lens, then the subject lens will be measured by the lens meter 100. The refractive power distribution data (data of a degree distribution, equal astigmatic-power curves M1 through M3, an optical axis, an axial direction of astigmatism, etc.) and the classification number of this measured subject lens are transmitted by the transmittance means 55. The transmitted refractive power distribution data and the like are input to the arithmetic control circuit 60 through the communication line T1 and the modem 54 and stored on the floppy disk 57.

Similarly, if a frame maker manufactures a new eyeglass frame, the shape of the new eyeglass frame will be measured by the frame shape measurement apparatus 200. The frame shape data and the type number of this measured eyeglass frame are transmitted by the transmittance means 56. The transmitted frame shape data and the like are input to the arithmetic control circuit 60 through the communication line T2 and the modem 54 and stored on the floppy disk 57.

Thus, each time a subject lens with a new classification number and an eyeglass frame with a new type number are manufactured, the refractive power distribution data and the frame shape data are stored and cumulated on the floppy disk 57 along with the new classification number and the new type number.

In eyeglass stores, an eyeglass frame and lenses in correspondence with the demand of a customer are selected, and the type number of the selected eyeglass frame and the classification number of the lenses are input by manipulation of the key switch of the keyboard 53. With this input, the refractive power distribution data and the frame shape data of a subject lens corresponding to the classification number and the type number are read out from the floppy disk 57. The refractive power distribution data read out is stored on the memory 61 and the frame shape data is stored on the memory 62.

Also, the eyepoint of the customer is measured by the eyepoint measurement apparatus 300. The eyepoint data measured by the eyepoint measurement apparatus 300 is transferred to the main body 51 and stored on the memory 83 of the main body 51.

Based on the data stored on these memories 61, 62, and 83, the image formation circuit 63 forms a lens image G1 of the subject lens showing the refractive power distribution, a frame image G2 of the lens frame, and an eyepoint mark image G3 showing an eyepoint position relative to the frame image G2. The image formation circuit 63 also causes the frame memory device 64 to store the lens image G1 and the frame memory device 65 to store the frame image G2 and the eyepoint mark image G3.

Figure 6:
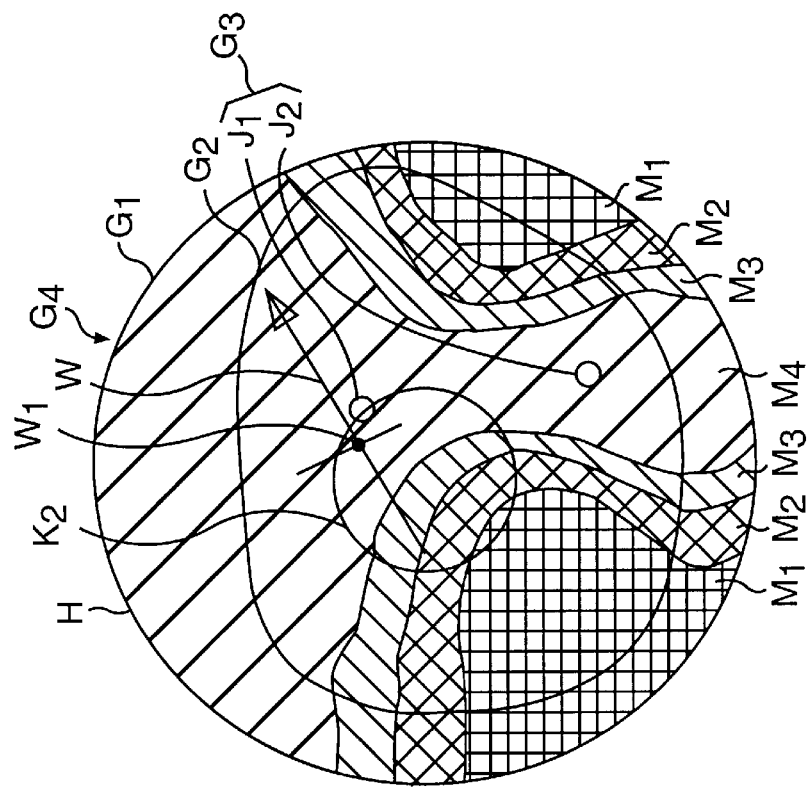
FIG. 6 is an explanatory diagram showing a synthesized image that is displayed on a monitor.

The arithmetic control circuit 60 causes the monitor 52 to display a synthesized image G4 in which the lens image G1, the frame image G2, and the eyepoint mark image G3, stored on the frame memories 64 and 65, are superimposed (see FIG. 6). More specifically, on the monitor 52 there is displayed the synthesized image G4 in which the lens image G1 and the frame image G2 are superimposed with each other and also the eyepoint mark image G3 is superimposed at the eyepoint position relative to the frame image G2.

The lens image G1 that is displayed on the monitor 52 consists of an external shape image H of a subject lens, degree distribution images M1 through M4, an arrow image W indicating an axial direction of astigmatism, and an optical-axis position image W1 indicating the optical axis position of a distance portion. The eyepoint image G3 has a distance visual point mark image J1 representing a distance visual point P and a near visual point mark image J2 representing a near visual point Pk. Note that the numerical values "−3.00" to "+0.00" shown on the upper left side of the lens image G1 represent the degree of a subject lens, and the unit of the degree is diopter.

The inspector moves the frame image G2 by key manipulation, while viewing the monitor 52. The eyepoint image G3 is also moved along with this frame image G2.

At this stage, a distance portion and a near portion can be judged from the degree distribution images M1 through M4 of the lens image G1, and the distance visual point mark image J1 and the near visual point mark image J2 of the eyepoint image G3 are positioned to the distance portion and the near portion (the distance visual point J1 is matched with the optical axis position image W1 or positioned in the vicinity of the image W1). At this time, judgment of processing advisability is performed by confirming whether or not the frame image G2 overflows the external shape image H of a subject lens and whether or not the distance visual point mark image J1 and the near visual point mark image J2 are positioned to the distance portion and the near portion, respectively.

Thus, since the degree distribution images M1 through M4 are displayed on the monitor 52 along with the external shape image H of a subject lens, the relationship between the distribution state of the lens characteristics of the subject lens and the lens frame is known. That is, the layout of the lens characteristics to the lens frame is known. Also, judgment of processing advisability can be visually performed while the distance visual point mark image J1 and the near visual point mark J2 which are the eyepoints of a subject are positioned to the distance portion and the near portion of the lens image G1 of the subject lens 104, and consequently, an accurate judgment on the advisability of processing can be formed even if the subject lens 104 is a progressive power lens.

Additionally, an eyeglass lens with the same shape and the same degree distribution as the shape displayed on the monitor 52 is obtainable by inputting the data of the synthesized image G4 to a ball grinding machine (not shown) and, based on that data, grinding a subject lens. That is, when grinding an progressive power lens, measurement of the quantity of insetting by marking or a scale becomes unnecessary.

If the eyeglass lens ground based on the data of the synthesized image G4 is put into the eyeglass frame, then the distance visual point P and near visual point Pk of the wearer will reliably be aligned with the optical axes of the far and near points of the eyeglass lens and therefore appropriate eyeglasses suitable for a wearer can be manufactured.

Figure 7:
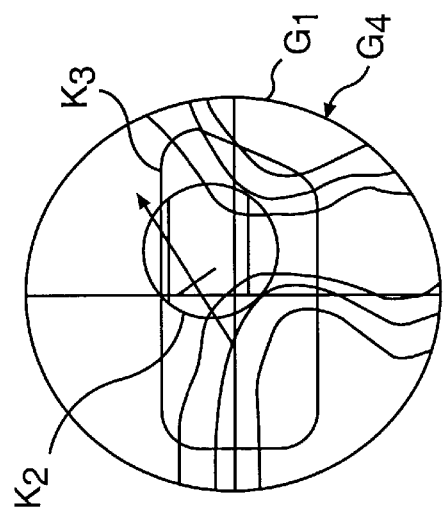
FIG. 7 is an explanatory diagram showing another example of the synthesized image that is displayed on the monitor.

In the case where a base lens is ground with a ball grinding machine, the shape of a suction disc for sucking the base lens may also be synthesized and displayed as shown in FIG. 6. In this case, a memory 67 is provided for storing the shape of the suction disc (see FIG. 2). By the synthesized display of the shape of the suction disc, when a base lens is ground, it can be judged whether or not the suction disc interferes with the grinding stone. For example, as shown in FIG. 7, if a lens is ground into a half-glasses shape K3, it will be understood that the suction disc and the grinding stone will interfere with each other, because the suction disc has protruded from the half-glasses shape K3. Consequently, the interference can be prevented.

After the superimposed image of the external shape of the subject lens 104 and the shape of the suction disc 110 has been observed with the monitor 52, the suction disc 110 can be mounted on the optical axis of the subject lens 104 only by mounting the suction disc 110 on the suction disc mounting portion 111' of the cover portion 111 of the drawer portion 112 of the lens meter 100 and closing the cover portion 111. Therefore, there is no necessity of a conventional marking operation and the suction disc 110 can be mounted on the subject lens 104 without employing an aligning device.

Also, even in the case of a rimless lens, as with the aforementioned, the shape of a rimless lens for demonstration can be measured with the frame shape measurement apparatus 200, and the shape of the rimless lens for demonstration can be superimposed on the lens image G1 and displayed on the monitor 52.

Figure 20:
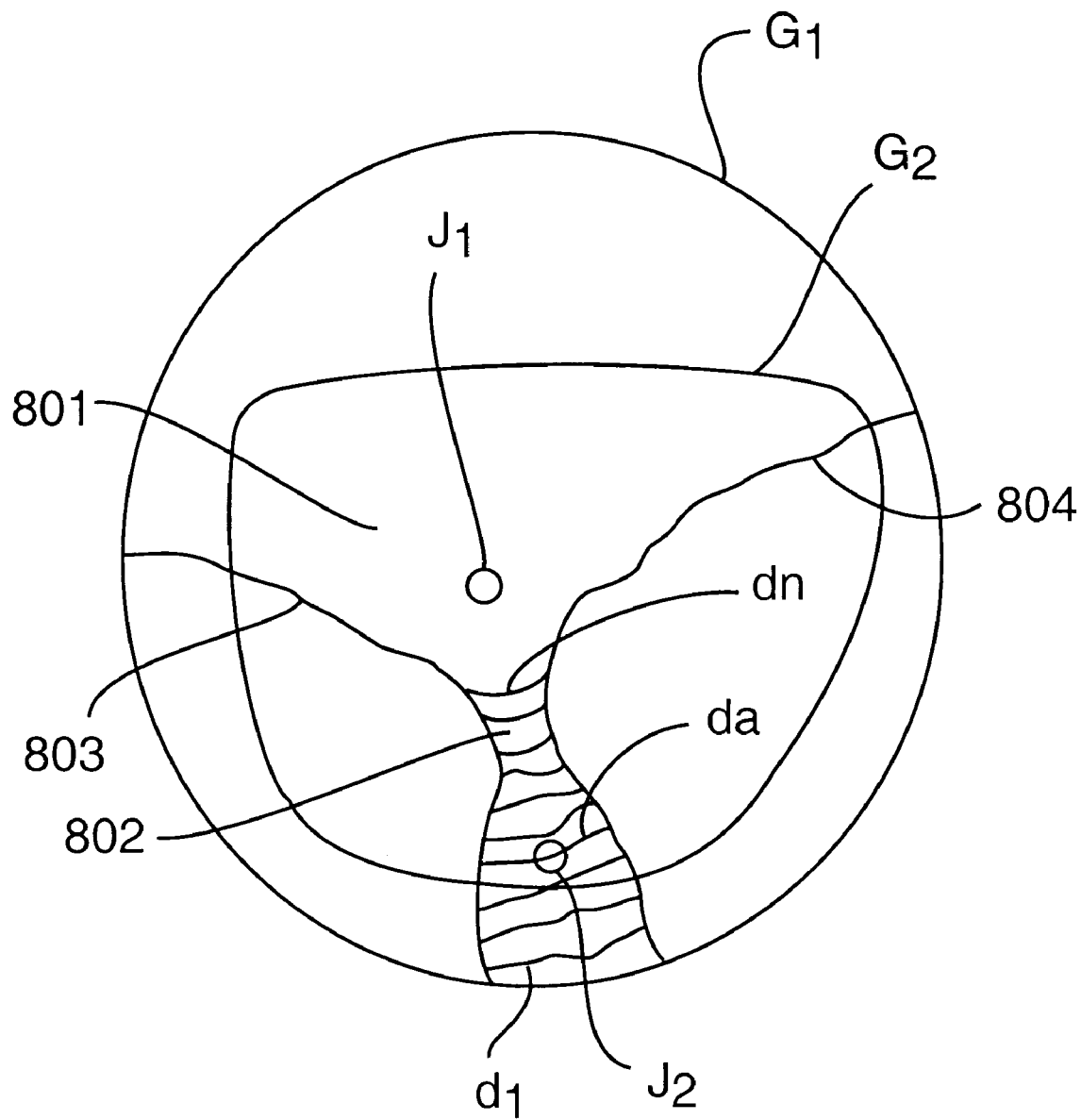
FIG. 20 is an explanatory diagram showing another example of the synthesized image that is displayed on a monitor.

In the aforementioned embodiment, while the image of the refractive power distribution has been displayed, the image of a distribution of astigmatism may also be displayed. In addition, as shown in FIG. 20, the equal degree lines d1 through dn of a spherical degree, the distance portion 801 of a subject lens, the progressive portion 802 continuous to the distance portion 801, the boundary line 803 between the progressive portion 802 and an area on the left of the progressive portion 802, and the boundary line 804 between the progressive portion 802 and an area on the right of the progressive portion 802 may also be displayed. In this case, if an equal degree line "da" which becomes a near visual point is displayed with emphasis, it will be easy to align the near visual point mark image J2 with the equal degree line "da", and the layout (positional relationship) of the distance visual point and near visual point of the subject lens 104 to the lens frame will be known. Also, accurate judgment of the processing advisability of the subject lens 104 can be performed. In this case a method of obtaining the boundary lines 803 and 804 is the same as an eighth embodiment to be described later.

Also, in the aforementioned embodiment, the eyepoints of a subject have been obtained by the eyepoint measurement apparatus 300, and based on the data of the obtained eyepoints, the distance visual point image J1 and the near visual point image J2 have been displayed on the frame image G2. However, a seal 700 (see FIG. 50) may also be made look as if it was attached to the subject lens 104, by obtaining the positions of the distance visual point and near visual point of the subject lens 104 from the lens characteristics of the subject lens 104 and displaying marks representing the distance visual point and the near visual point (marks such as double marks) at the obtained positions on the lens image G1.

If done in this way, the seal 700 will be unnecessary and an operation of attaching the seal 700 in correspondence with a hidden mark applied to the subject lens 104 will be unnecessary.

For the positions of the distance visual point and the near visual point, the distance from the geometric center position of the subject lens 104 to each position has been determined (by each maker and type (lens type)). Therefore, if the geometric center position is obtained, then the positions of the distance visual point and the near visual point will be obtainable. The geometric center position is one which is obtained from the prismatic quantities in X and Y directions. Therefore, if the lens characteristics of the subject lens 104 are previously given, the geometric center position can be obtained from the prismatic quantities in X and Y directions, because the prismatic quantities in the geometric center position have been determined (by each maker and type (lens type)). A maker and a lens type can be known by viewing a hidden mark applied to the subject lens 104. And, it will be sufficient if the aforementioned data corresponding to makers and types (data of a prismatic quantity in a geometric center position and data of distance from a geometric center position to a distance visual point or a near visual point) are previously stored on memory. Alternatively, that data may also be input.

In the aforementioned embodiment, while the refractive power distribution data and the frame shape data have been transmitted and stored on the floppy disk 57, this data may also be input with a keyboard or an IC card.

Also, in the aforementioned embodiment, although a description has been made of the case where the lens meter 100 is installed in a lens maker and the frame shape measurement apparatus 200 is installed in a frame maker, the present invention is not limited to this case. For example, both the lens meter 100 and the frame shape measurement apparatus 200 may also be installed in an eyeglass store. In this case, the transmission means and the modem become unnecessary. Additionally, the judgment apparatus 50, the lens meter 100, and the frame shape measurement apparatus 200 may also be installed in a lens processing factory.

In addition, the main body 301, the monitor 302, and the keyboard 303 become unnecessary by sharing the main body 51, the monitor 52, and the keyboard 53 of the judgment apparatus 50 with the eyepoint measurement apparatus 300 although the main body 51, the monitor 52, and the keyboard 53 of the judgment apparatus 50 are separate from the main body 301, the monitor 302, and the keyboard 303 of the eyepoint measurement apparatus 300 in the aforementioned embodiment. Also, an integral layout judgment apparatus in which the judgment apparatus 50 and the lens meter 100 are formed integrally with each other may also be made by incorporating the judgment apparatus 50 into the lens meter 100.

In addition, in the aforementioned embodiment, while the frame image G2 has been superimposed on the synthesized image G4 and displayed, the synthesized image G4 and the frame image G2 may also be displayed in a row. Even in this case the layout of the lens characteristics to the lens frame can be judged.

Second Embodiment

FIG. 8 shows the optical system of another lens meter 100A. In this second embodiment a liquid crystal shutter 110 as light-beam selecting means is interposed between a micro lens array 103 and a tungsten lamp 101. Here, the liquid crystal shutter 110 is interposed between a collimator lens 102 and the micro lens array 103. The liquid crystal shutter 110 has a region 110a (see FIG. 9) which transmits or shuts off each light beam emergent from each microscopic lens 103a. In this liquid crystal shutter 110 the transmitting/shutting-off region 110a is opened and closed in predetermined order, as shown in FIG. 9, by a drive circuit (not shown). The area of this transmitting/shutting-off region 110a is substantially equal to that of each microscopic lens 103a. In FIG. 9, oblique-line regions denoted by reference numeral 110b mean that the transmitting/shutting-off regions are closed.

In the case where the power of the subject lens 104 is great, if the spacing between the centers of adjacent microscopic lenses 103a (inter lens distance) d is made shorter and the density of the microscopic lenses per unit area is made greater, condensed light beams Pi will cross each other and be guided onto a light receiving sensor 108, and consequently, there will occur the case where the light beam from the (n, m)th microscopic lens 103a will not correspond to the (n, m)th position on the light receiving sensor 108. However, if the transmitting/shutting-off regions 110a are opened in order in an arrow-indicating direction by employing the liquid crystal shutter 110 and if light beams are guided onto the light receiving sensor 108, a corresponding relationship can be established between the incident position of a light beam on the front surface 104a of the subject lens 104 and the position of that light beam on the light receiving sensor 108, without changing the distance Z between the subject lens 104 and the relay lens 106 and the distance "d" between microscopic lenses 103a.

Particularly, if the distance Z between the subject lens 104 and the relay lens 106 is made shorter, the displacement quantity of the light spot image 103a' on the light receiving sensor 108 per unit degree will be reduced and therefore measurement accuracy will be reduced. However, according to this second embodiment, even in the case where the power of the subject lens 104 is great, a corresponding relationship can be established between the incident position of a light beam on the front surface 104a of the subject lens 104 and the position of that light beam on the light receiving sensor 108, while maintaining a large distance Z between the subject lens 104 and the relay lens 106 to such a degree that measurement accuracy is not reduced. Also, if the distance "d" between the microscopic lenses 103a is made longer, the number of light spot images 103a' in a range of measurement (field of measurement) will be reduced and therefore measurement accuracy will likewise be reduced, however, the reduction in measurement accuracy can also be eliminated according to the second embodiment 2 of this invention. The transmitting/shutting-off regions 110a of the liquid shutter 110 are opened in order as described above, and in addition to this, the following methods can be adopted.

Figure 10A:
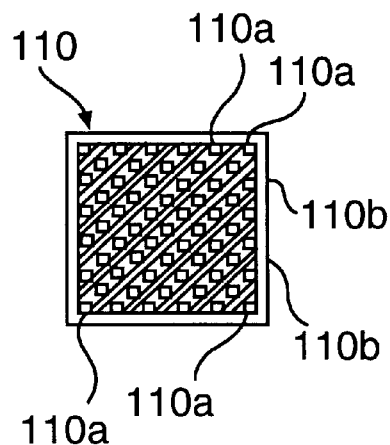
FIG. 10(A) is an explanatory diagram of an opening and closing method of the liquid crystal shutter, the transmitting/shutting-off regions of the liquid crystal shutter having been opened checkerwise.
Figure 10B:
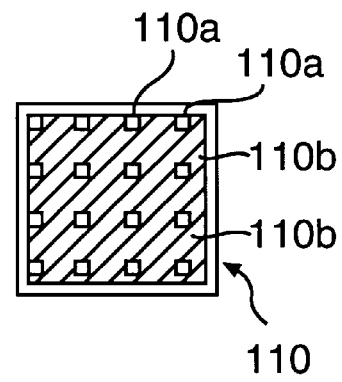
FIG. 10(B) is an explanatory diagram of an opening and closing method of the liquid crystal shutter, the transmitting/shutting-off regions having been opened with spacing.
Figure 10C:
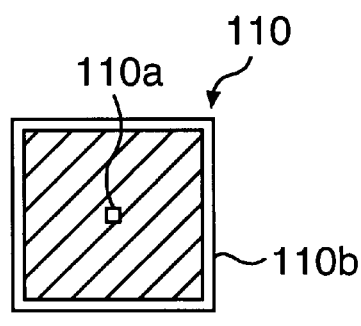
FIG. 10(C) is an explanatory diagram of an opening and closing method of the liquid crystal shutter, only the center one of the transmitting/shutting-off regions having been opened.

For example, as shown in FIG. 10(A), all light spot images 103a' may also be sampled by opening the transmitting/shutting-off regions 110a checkerwise at the same time and then closing the transmitting/shutting-off regions 110a and opening the oblique-line regions 110b at the same time. Also, as shown in FIG. 10(B), the transmitting/shutting-off regions 110a may also be opened at longer intervals. When the subject lens 104 is a negative lens with a strong degree shown in FIG. 5(G) or a prism with a strong degree and peripheral light spot images 103a' protrude from the light receiving sensor 108, a measurement may also be made by opening the center transmitting/shutting-off region 110a once as shown in FIG. 10(C), also by confirming the positions of the microscopic lens 103a corresponding to these light spot images 103a, and based on these positions, by opening all of the transmitting/shutting-off regions 110a or opening the transmitting/shutting-off regions 110a as shown in FIG. 10(A) or FIG. 10(B).

Figure 10D:
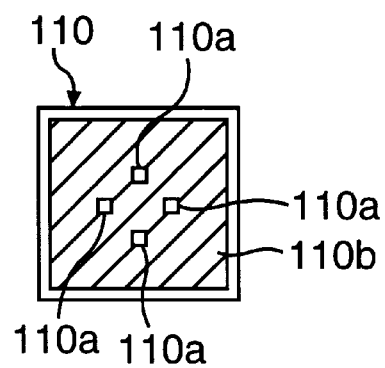
FIG. 10(D) is an explanatory diagram of an opening and closing method of the liquid crystal shutter, four transmitting/shutting-off regions in right-and-left and up-and-down symmetrical positions in the center having been opened.

Also, the opening and closing method of the liquid crystal shutter 110 may also be changed, by opening the transmitting/shutting-off regions 110a at such intervals that condensed light beams do not cross each other when the degree of the subject lens 104 is +25 diopters, then temporarily measuring three or more transmitting/shutting-off regions 110a in the vicinity of the center of the liquid crystal shutter 110 as shown in FIG. 10(D), and according to the degree of the temporarily measured subject lens 104.

For example, in the case where the subject lens 104 is a positive spherical lens with a strong degree, the opening and closing method shown in FIG. 10(B) is adopted. In the case of a positive spherical lens with a medium degree and a positive spherical lens with a little less than a medium degree, the opening and closing method shown in FIG. 10(A) is adopted. In the case of a positive spherical lens with a weak degree and a negative spherical lens, all transmitting/shutting-off regions 110a of the liquid crystal shutter 110 are opened at a time. To make a long story short, it will be sufficient if the incident position of a light beam on the surface 104a of the subject lens 104 and the position of the light beam onto the light receiving sensor 108 can temporally and spatially correspond to each other. In the second embodiment, while the liquid crystal shutter 110 has been interposed between the micro lens array 103 and the collimator lens 102, the liquid crystal shutter 110 may also be arranged immediately after the micro lens 103 between the micro lens array 103 and the subject lens 104.

Note that in the case where four of the transmitting/shutting-off regions 110a, as shown in FIG. 10(D), are opened symmetrically with respect to the center (corresponding to the optical axis O), the four transmitting/shutting-off regions can be used as a normal lens meter.

Third Embodiment

Figure 11:
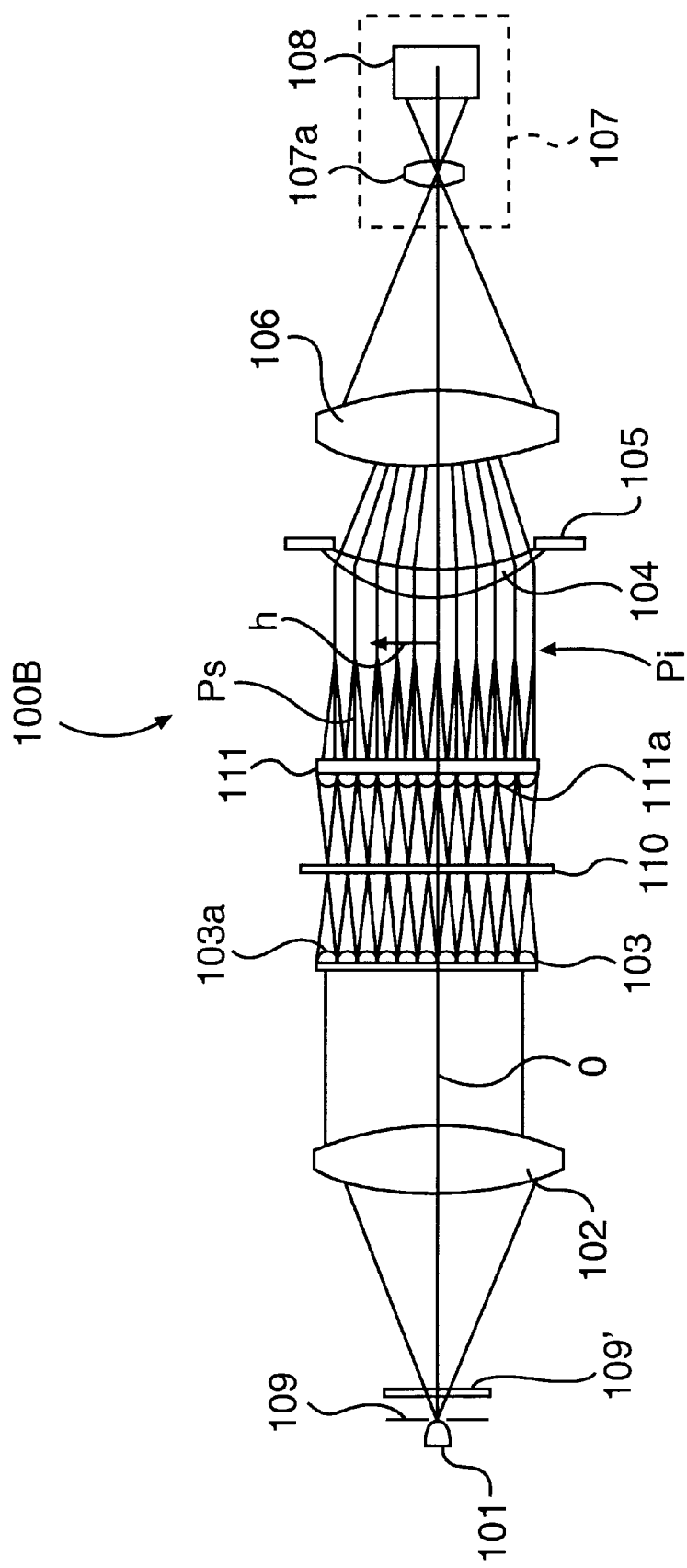
FIG. 11 is an optical layout diagram showing the optical system of the lens meter of a third embodiment.

FIG. 11 shows the optical system of a lens meter 100B according to a third embodiment. In this third embodiment, between a collimator lens 102 and a subject lens 104 two micro lens arrays 103 and 111 are arranged with spacing, and a liquid crystal shutter 110 is arranged at the back focal position of the micro lens array 103. Here, the micro lens array 111 has microscopic lenses 111a, and the microscopic lenses 111a correspond to the microscopic lenses 103a, respectively. The micro lens array 111 is arranged so that a light source portion and the subject lens 104 become conjugate with each other.

According this third embodiment, since a transmitting/shutting-off region 110a is provided at a position where a light beam is focused, so the area of the transmitting/shutting-off region 110a can be reduced compared with the second embodiment of the present invention. Consequently, the third embodiment has the advantage that switching of the transmitting/shutting-off operation can be quickly performed.

Fourth Embodiment

Figure 12A:
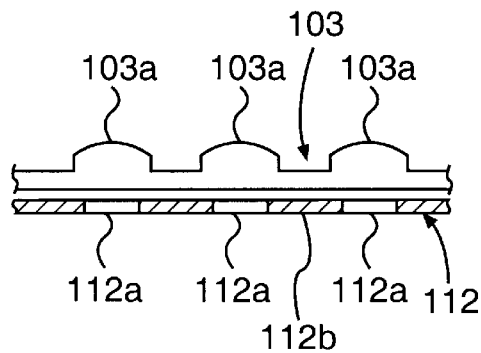
FIG. 12(A) is a diagram showing a diaphragm provided immediately in front of a micro lens array of a lens meter.
Figure 12B:
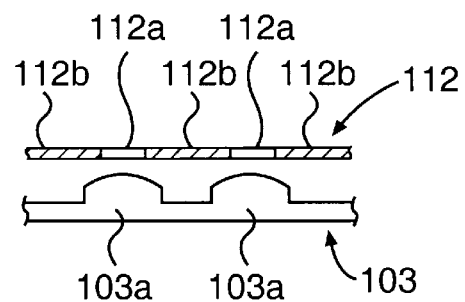
FIG. 12(B) is a diagram showing a diaphragm provided immediately after the micro lens array.
Figure 12C:
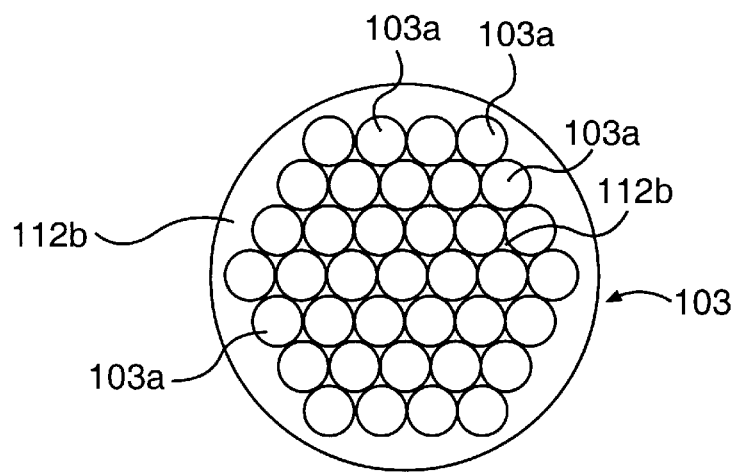
FIG. 12(C) is a diagram showing the micro lens array itself provided with a diaphragm.

FIG. 12 shows a diaphragm 112 provided in the micro lens array shown in FIGS. 8 and 11. The diaphragm 112 has openings 112a corresponding to the microscopic lenses 113a, and a region other than the openings 112a of the diaphragm 112 is a light shutting-off portion. In the case of the optical system shown in FIG. 3, this diaphragm 112 may also be provided immediately in front of the micro lens array 103 between the collimator lens 102 and the micro lens array 103, as shown in 12(A).

The diaphragm 112 may also be provided immediately after the micro lens array 103 between the micro lens array 103 and the subject lens 104, as shown in 12(B). In addition, in the case of the optical system shown in FIG. 8, the diaphragm 112 is provided between the liquid crystal shutter 110 and the micro lens array 103 or provided immediately after the micro lens array 103.

According to this lens meter, scattered light from adjacent microscopic lenses 103a is prevented from reaching the light receiving sensor 108 and being formed on the light receiving sensor 108 as a light spot image. That is, a light spot image which does not meet the image formation conditions of the microscopic lens 103a can be prevented from coexisting in the light receiving sensor 108.

Fifth Embodiment

Figure 13:
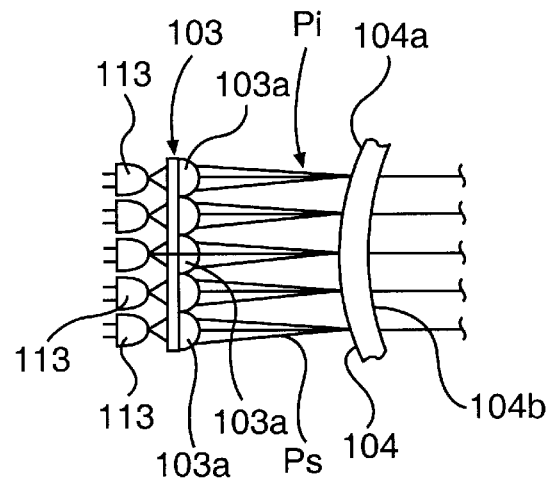
FIG. 13 is an explanatory diagram showing the optical system of the lens meter of a fifth embodiment.

FIG. 13 shows the optical system of a lens meter according to a fifth embodiment. In this fifth embodiment of the present invention, a light source portion is made up of a plurality of light-emitting diodes (LEDs) 113 (e.g., 1000 LEDs). The LEDs 113 are disposed in correspondence with the microscopic lenses 103a of a micro lens array 103.

According to this embodiment, since the LEDs 113 are lit in sequence and the positions of light spot images 103a' can be measured, the corresponding relationship between the microscopic lens 103a and the light spot image 103a' can be established in the same way as the embodiment having the liquid crystal shutter 110, without using the liquid crystal shutter 110. Loss of light quantity corresponding to the shutter can be prevented.

Sixth Embodiment

Figure 14A:
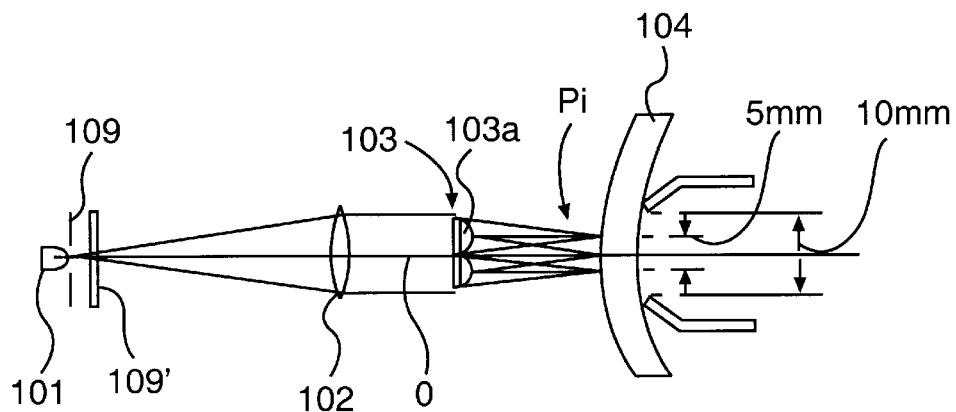
FIG. 14(A) is an explanatory diagram showing an example of a lens meter of a sixth embodiment where a tungsten lamp is provided in a light source portion, also a light beam emitted through a diaphragm and a filter is emitted as a collimated light beam by a relay lens, and furthermore, three light beams are projected onto a subject lens by microscopic lenses.
Figure 14B:
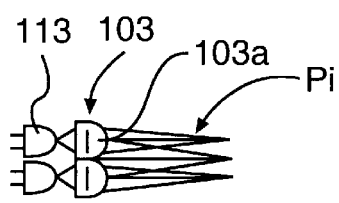
FIG. 14(B) is an explanatory diagram showing another example of the lens meter where three LEDs correspond to three microscopic lenses in a light source portion and also three light beams are irradiated on a subject lens by microscopic lenses.

FIGS. 14(A) and 14(B) show the optical system of a lens meter according to a sixth embodiment. In this sixth embodiment the number of microscopic lenses 103a is 3 and light beams are projected in a range of 5 mm near an optical axis of measurement to obtain the average degree of the center of the optical axis of measurement in the same way as hitherto. FIG. 14(A) shows an embodiment in which a tungsten lamp 101 is provided in a light source portion, also a light beam emitted through a diaphragm 109 and a filter 110' is emitted as a collimated light beam by a relay lens, and three light beams are irradiated on a subject lens 104 by microscopic lenses 103a'. FIG. 14(B) shows an example of the case where three LEDs 113 correspond to three microscopic lenses 103a' in a light source portion and also three light beams are irradiated on a subject lens 104 by microscopic lenses 103a'.

According to this lens meter, the cost of optical devices is greatly reduced compared with conventional lens meters and miniaturization can also be achieved. In the sixth embodiment of this invention, the transmission range of the light beams on the subject lens 104 has been at 5 mm or less, however, in the case of a contact lens, it is preferable that the range be at 3 mm or less. Note that the number of microscopic lenses 103a is not limited to 3 but may also be 4 or more.

Seventh Embodiment

Figure 15:
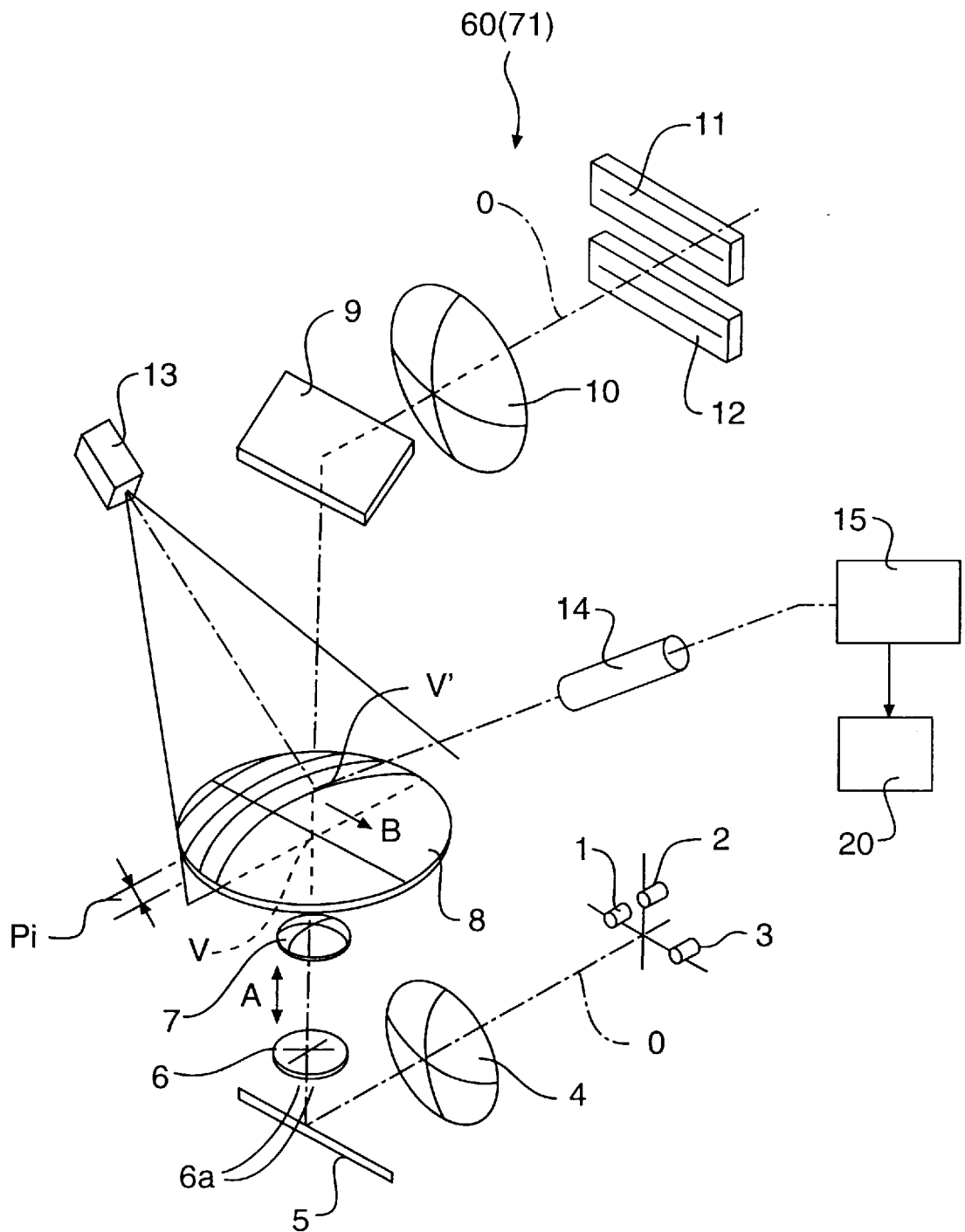
FIG. 15 is an explanatory diagram showing the optical system of the lens meter of a seventh embodiment.

In FIG. 15 lens meters 60 and 61 have LEDs 1, 2, and 3 as a source of irradiation light, a collimator lens 4, a total reflecting mirror 5, a target plate 6, an image forming lens 7, a total reflecting mirror 9, a projection lens 10, and a pair of line CCDs 11 and 12. Reference numeral 8 denotes a subject lens. On the front focal plane of the collimator lens 4, the LEDs 1, 2, and 3 are arranged on a predetermined circle having the optical axis O of the optical system as its center. The target plate 6 has slit-shaped openings 6a and is constructed so as to movable back and force along the optical axis O of the optical system with the back focal position of the collimator lens 4 as a reference position. The front focal position of the image forming lens 7 is aligned with the reference position of the target plate 6, and the back focal position of the image forming lens 7 is aligned with the vertex position V of the rear surface of the subject lens 8 (a surface near an eye when worn as eyeglasses).

The projection lens 10 is interposed between the total reflecting mirror 9 and the pair of line CCDs 11 and 12, and the pair of line CCDs 11 and 12 is arranged on the back focal plane of the projection lens 10. The light source images of the LEDs 1 through 3 are formed at the vertex position V on the front side of the subject lens 8, and the magnification of the optical system of this lens meter and the position of the LEDs are selected so that the radius of a circle passing through the light source images is about 4 mm or less.

If at least two LEDs of the three LEDs are employed and these LEDs are operated in a time series manner, the images of the openings 6a of the target plate 6 illuminated by the LEDs will be formed on the line CCDs 11 and 12. In the case where the target plate 6 is at the reference position and the subject lens 8 does not exist in the optical system (0 diopter), the center of line patterns as the slit images of the openings 6a of the target plate 6 is formed in alignment with the optical axis O. If the subject lens 8 is inserted in the optical system, then the slit images of the openings 6a will be dim in correspondence with the degree of the subject lens 8 at a position at which the slit images are formed, and the position at which the images of the openings 6a are formed will be offset from the optical axis 0. Hence, the target plate 6 is moved along a direction of arrow A so that the degree of the subject lens 8 is canceled, that is, so that the slit images of the openings 6a by the light sources are superimposed, and the movement quantity of this target plate 6 is obtained. The degree of the subject lens 8 is measured by the movement quantity of the target plate 6.

In this optical system a line-shaped light beam projection source 13 is provided on one side of the optical axis O for projecting a line-shaped light beam in an oblique direction toward the subject lens 8. On the other side of the optical axis O, there is provided a CCD camera 14 which receives a line-shaped light beam reflected regularly at the front surface of the subject lens 8 (a surface far away from an eye when worn as eyeglasses).

This CCD camera 14 is connected to an arithmetic control circuit shown in FIG. 15. The line-shaped light beam projection source 13 and the CCD camera 14 as a whole constitute three-dimensional shape measurement means which measures a three-dimensional shape. Also, the line-shaped light beam projection source 13 and the CCD camera 14 function as degree measurement means which measures the degree of a subject lens and as lens thickness measurement means which measures the thickness of a lens.

The line-shaped light beam projection source 13 optically cuts the subject lens 8 in a direction of arrow B. The regularly reflected light beam is received by the CCD camera 14.

A line-shaped image which is formed on the CCD camera 14 becomes a distorted image in correspondence with the curve of the subject lens 8. The image output of the CCD camera 14 is input to the arithmetic control circuit 15. Based on the image output, the arithmetic control circuit 15 computes the shape of the subject lens 8 at the position at which the subject lens 8 is optically cut. If this computation is performed at intervals of a predetermined pitch pi, a three-dimensional shape C1 on the front surface of the subject lens 8 can be measured. If a similar measurement is made for the shape on the rear side of the subject lens 8, a three-dimensional shape C2 on the rear surface of the subject lens 8 can be measured.

Figure 16:
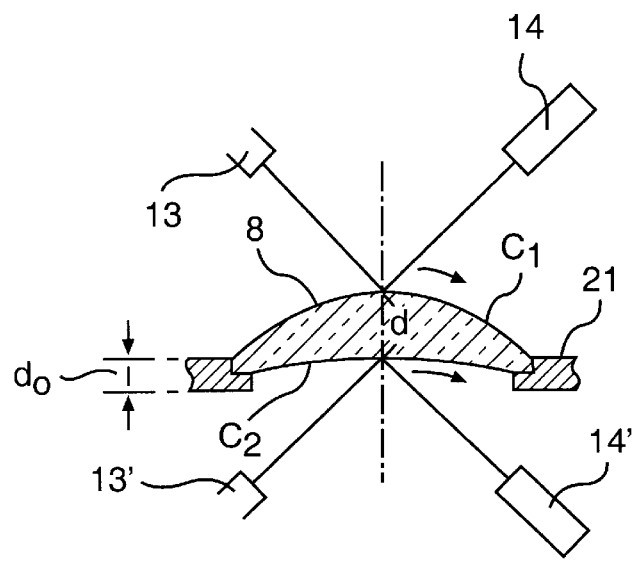
FIG. 16 is a schematic view showing a three-dimensional shape measurement apparatus for the lens meter of FIG. 15.
Figure 17A:
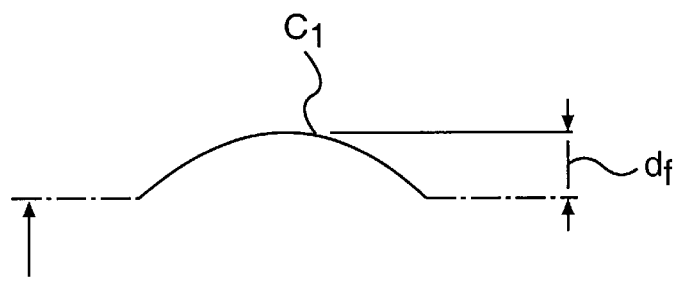
FIG. 17(A) shows a shape example of the front surface of a subject lens obtained by the three-dimensional shape measurement apparatus.
Figure 17A:
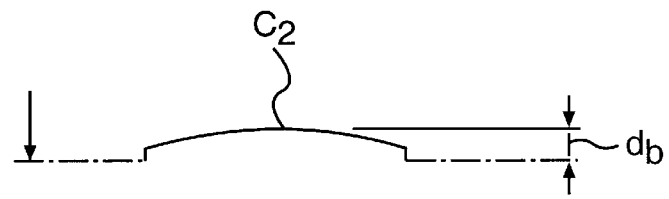

At this time, in addition to the line-shaped light beam projection source 13 and the CCD camera 14 which are used for front side measurement, a line-shaped light beam projection source 13' and a CCD camera 14' may also be prepared for rear side measurement, as shown in FIG. 16. The rear side measurement unit can also be constructed so that the line-shaped light beam from the line-shaped light beam projection source 13 is guided to the rear side of the subject lens 8 by a total reflecting mirror (not shown) and that the light beam reflected regularly at the rear side is guided to the CCD camera 14 by the total reflecting mirror (not shown). Note that a structure for scanning a spot light source in a one-dimensional direction may also be adopted instead of the line-shaped light beam projection source 13. Also, other known non-contact types or contact types may also be used as three-dimensional shape measurement means. In FIG. 16 reference numeral 21 denotes a lens holder, The thickness "d" of the subject lens 8 can be measured, based on the measurement result of the shapes of the front and rear surfaces of the subject lens 8 and on the position of the image on the CCD camera 14. For example, when the front surface shape C1 obtained from the CCD camera 14 shown in FIG. 16 is the one shown in FIG. 17(A) and the rear surface shape C2 obtained from the CCD camera 14' is the one shown in FIG. 17(B), the thickness "d" of the subject lens 8 is obtained by the following equation:

$$d = df + d0 - db$$

where d0 is the reference thickness of the lens holder 21. The measurement of the thickness "d" of the subject lens 8 on the reference position is not limited to the aforementioned method. For example, when a three-dimensional shape measurement is made with a contact type probe, the thickness "d" of the subject lens 8 may also be obtained by computing the relative position between this probe and the lens holder 21.

Figure 18:
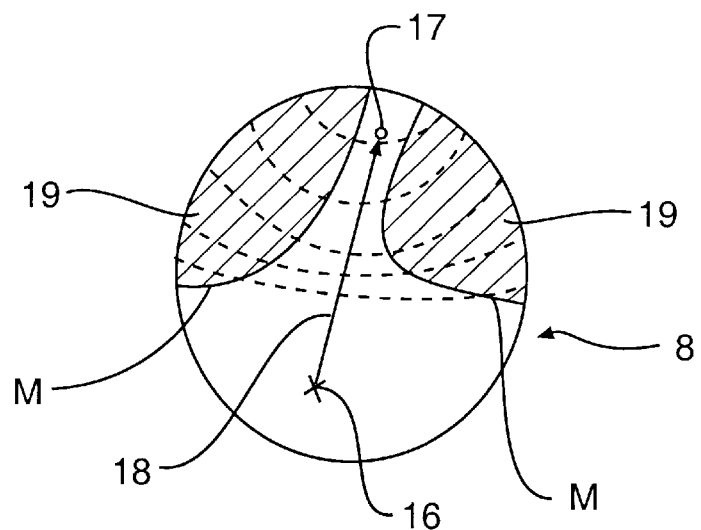
FIG. 18 is a plan view showing an example of the subject lens.

Here, the subject lens 8 is a progressive power lens such as that shown in FIG. 18. In the figure, reference numeral 16 is a distance portion, reference numeral 17 a near portion, and reference numeral 18 a progressive band portion. Although a spherical degree S varies from the distance portion 16 toward the near portion 17, a cylindrical degree C and an axial angle degree A do not vary basically. On the other hand, regions 19 indicated by oblique lines are regions where the cylindrical degree C and the axial angle degree A vary (nonuse side regions). In this embodiment, the astigmatic degree of the subject lens 8 is assumed to be zero for simplification of a description. Also, the position at which the subject lens 8 is first placed is taken to be a reference position. When the position is, for example, at the distance portion 16, the spherical degree S on the distance portion 16 is measured.

Figure 19:
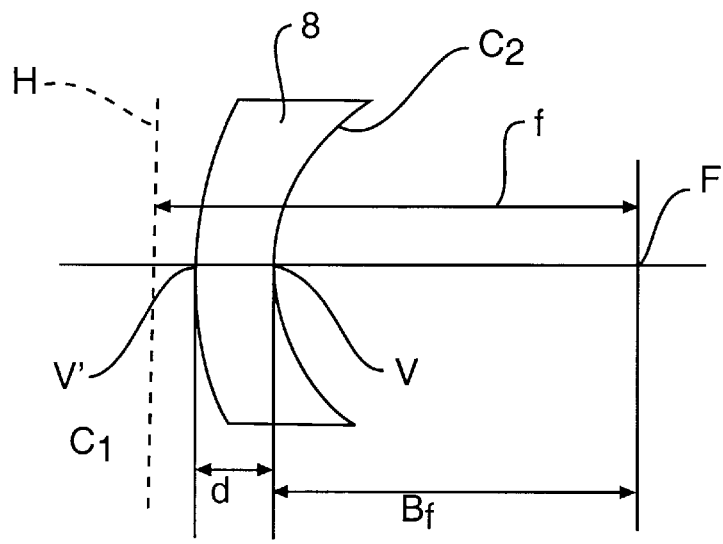
FIG. 19 is a side view of the subject lens.

Since it is considered that the material of the subject lens 8 is manufactured uniformly over the entire region of the lens and is by no means different partially, it is supposed that the subject lens 8 is constant in refractive index N at any position. Also, as shown in FIG. 19, the thickness of the subject lens 8 at a reference position as a place of measurement for the spherical degree S is taken to be "d," and at the reference position, a back focal distance from a principal plane H to a focal point F is taken to be "f." In addition, at this reference position, the back focal distance of the subject lens 8 from the rear vertex V to the focal point F is taken to be Bf. Generally, the curvature on the front side of the position at which the subject lens 8 is first placed is taken to be C1 and the curvature on the rear side is taken to be C2.

At this time, the following equations are established.

$$Bf = f * \{1 - C1 * d * (N-1)/N\} \quad (1)$$

$$f = 1/(N-1) * \{C1 - C2 + C1 * C2 * d * (N-1)/N\} \quad (2)$$

Substituting the back focal distance "f" of Eq. (2) into the back focal distance "f" of Eq. (1) gives a quadratic equation for refractive index N.

$$N*N*Bf*(C1 - C2 + C1*C2*d) + \quad (3)$$
$$N(-Bf*C1 + Bf*C2 - 2Bf*C1*C2*d + C1*d - 1) +$$
$$(-C1*d + Bf*C1*C2*d) = 0$$

In general, a relation of Bf=1/S is established between the spherical degree S at the reference position and the back focal distance Bf. Therefore, if Eq. (3) is solved according to a method of solution of a quadratic equation, the refractive index N of the subject lens 8 will be obtainable.

When the subject lens 8 is assumed to be a thin lens, from a formula for a thin lens the following equation is generally established between the refractive index N, the curvature C1, the curvature C2, and the back focal distance "f."

$$S = 1/f = (N-1)(C1-C2) \quad (4)$$

Therefore, the following equation is obtained.

$$S' = 1/f' = (N-1)(C1i' - C2i') \quad (5)$$

where C1i' and C2i' are the curvatures at arbitrary positions on the subject lens 8, f' is the back focal distance, and S' is the spherical degree.

Now, since the refractive index N is obtained from Eq. (3) and C1i' and C2i' are obtained by the three-dimensional shape computation means, the spherical degree S' at an arbitrary position on the test lens 8 is obtained.

These arithmetic operations are performed by the arithmetic control circuit 15, and the arithmetic result is displayed as an equal degree line on the monitor 20. In FIG. 18 a broken line denotes the equal degree line. Note that in FIG. 18 there is shown only one equal astigmatic-power curve M.

The arithmetic control circuit 15 has a function as refractive index computation means which computes the refractive index of the subject lens 8.

Eighth Embodiment

A layout judgment apparatus according to an eighth embodiment will next be described based on the drawings.

Figure 29:
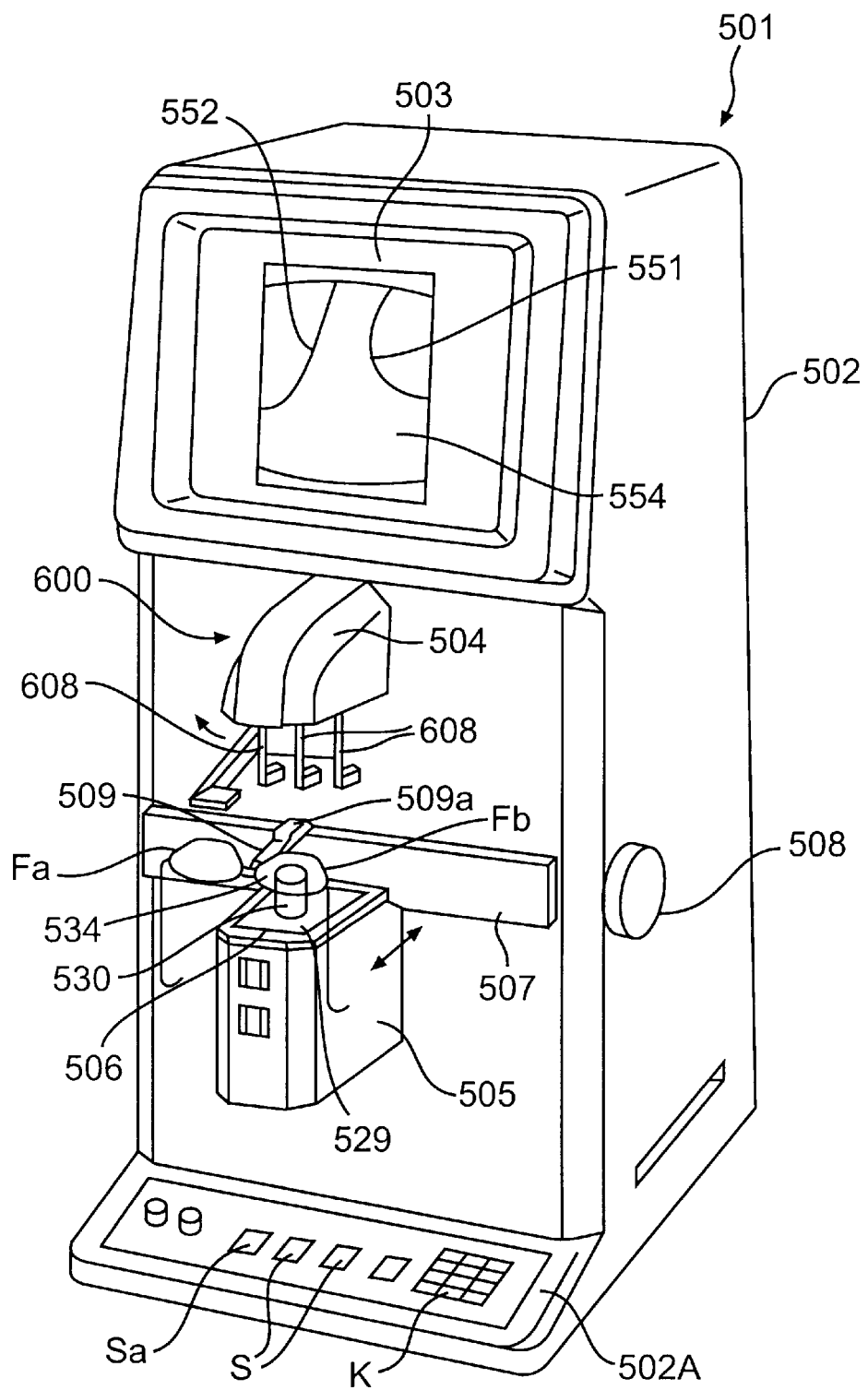
FIG. 29 is a perspective schematic view showing the lens meter of an eighth embodiment.

In FIG. 29, reference numeral 501 is a layout judgment apparatus (lens meter) and 502 is the main body of the lens meter 501. 503 is a display provided on the upper portion of the main body 502 and consisting, for example, of a liquid crystal. 504 is an upper optical-component housing portion provided on the front side of the main body 502. 505 is a lower optical-component housing portion provided so as to be positioned under the upper optical-component housing portion, and 506 is a lens holding table provided on the upper end of the lower optical-component housing portion 505. 507 is a lens pad table positioned between both housing portions 504 and 505 and held on the front surface of the main body 502 so as to be movable back and forth. 508 is a lens-pad control dial held on the side surface of the main body 502 so as to be rotatable back and forth. The lens pad table 507 is moved and adjusted in a back-and-forth direction by rotating the dial 508.

A slider 509a is held on the upper edge portion of the lens pad table 507 so as to be freely movable right and left, and a nose-pad support member 509 is held on this slider 509a so as to be rotatable up and down. This nose-pad support member 509 is urged upward by a spring (not shown) and also upward rotation is regulated at a horizontal position.

A marking device 600 is provided in the upper optical-component housing portion 505. This marking device 600 is equipped with three marking arms 608 which are rotated into a horizontal state by a solenoid (not shown) and a motor (not shown) which moves these marking arms 608 up and down. A mark can be put on a subject lens mounted on a lens receiving cylinder 530, by downward movement of the marking arms 608.

Also, a control portion 502A is provided on the lower portion of the main body 502. This control portion 502A is provided with mode switches Sa through Sc for setting various measurement modes and key switches K for inputting various data and control commands.

Figure 30:
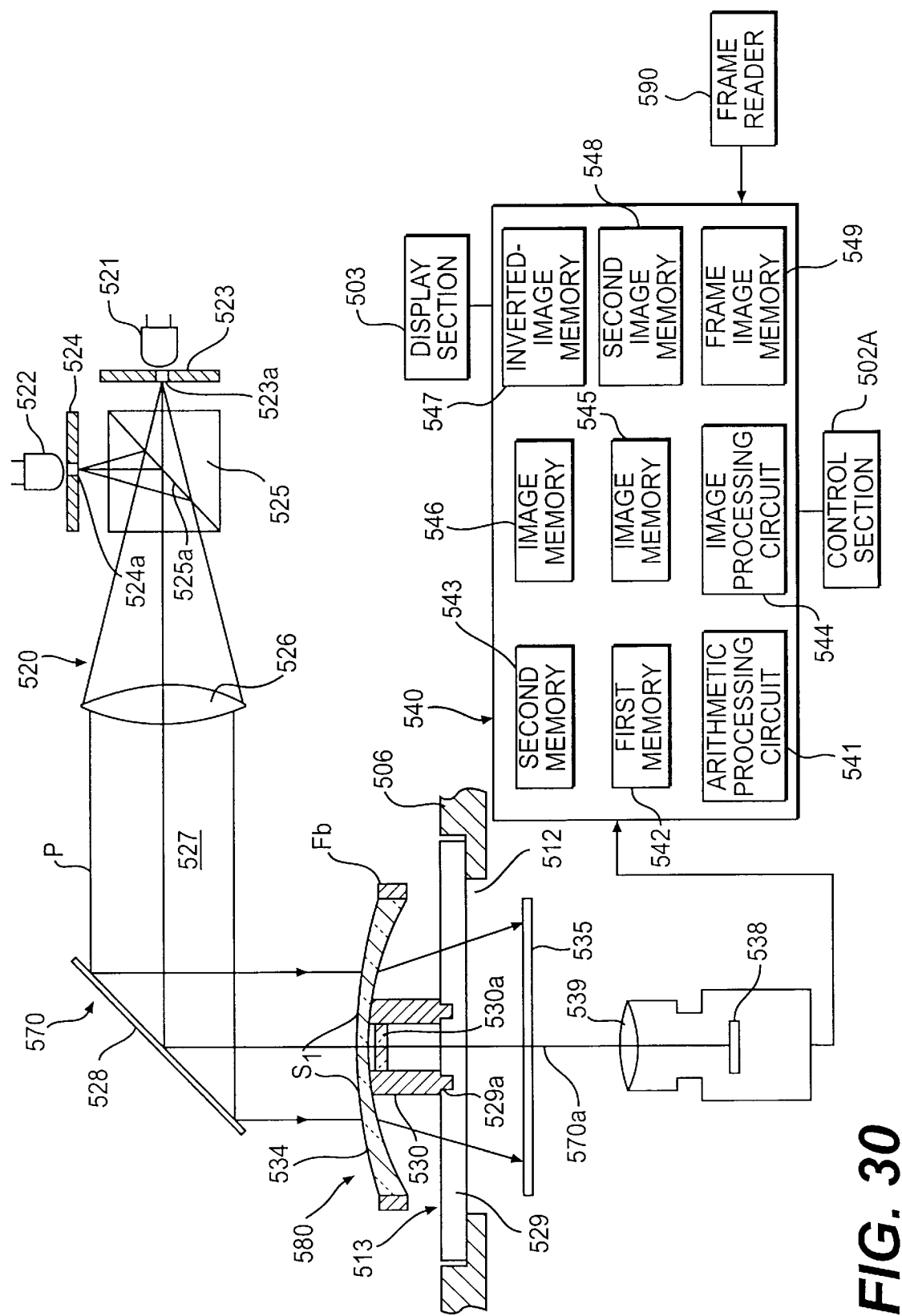
FIG. 30 is an optical diagram of the lens meter of FIG. 29.

The lens receiving table 506 is formed with a stepped mounting hole 512, as shown in FIG. 30. A lens receiver 513 is provided in the mounting hole 512. An unprocessed lens (base lens) or an eyeglass lens 534 framed in a frame Fb is set on the lens receiver 513.

An optical measurement system 570 shown in FIG. 30 is provided in the main body 502. The optical measurement system 570 is made up of a light projecting system 520 and a light receiving system 580, as shown in FIG. 30. The light projecting system 520 comprises a light source portion for generation of a measuring light beam, a collimator lens 526, and a reflecting mirror 528.

The light source portion consists of LEDs 521 and 522, pin hole plates 523 and 524, and a beam splitter 525. Reference numerals 523a and 524a denote pin holes. In this embodiment, the LED 521 generates a measuring light beam of wavelength 550 nm and the LED 522 generates a measuring light beam of wavelength 660 nm, and it is assumed that the wavelengths of the measuring light beams of the two LEDs 521 and 522 differ from each other. The beam splitter 525 is formed with a dichroic mirror surface 525a, which transmits a measuring light beam of wavelength 550 nm and reflects a measuring light beam of wavelength 650 nm.

The measuring light beams are joined and then are guided to the collimator lens 526. The pin hole plates 523 and 524 are arranged at the focal positions of the collimator lens 526, and the measuring light beams are made into a collimated light beam P by the collimator lens 526. On the way of the optical projected-light path 527 of the collimated light beam P, the reflecting mirror 528 is provided over the lens receiving table 506.

Figure 31:
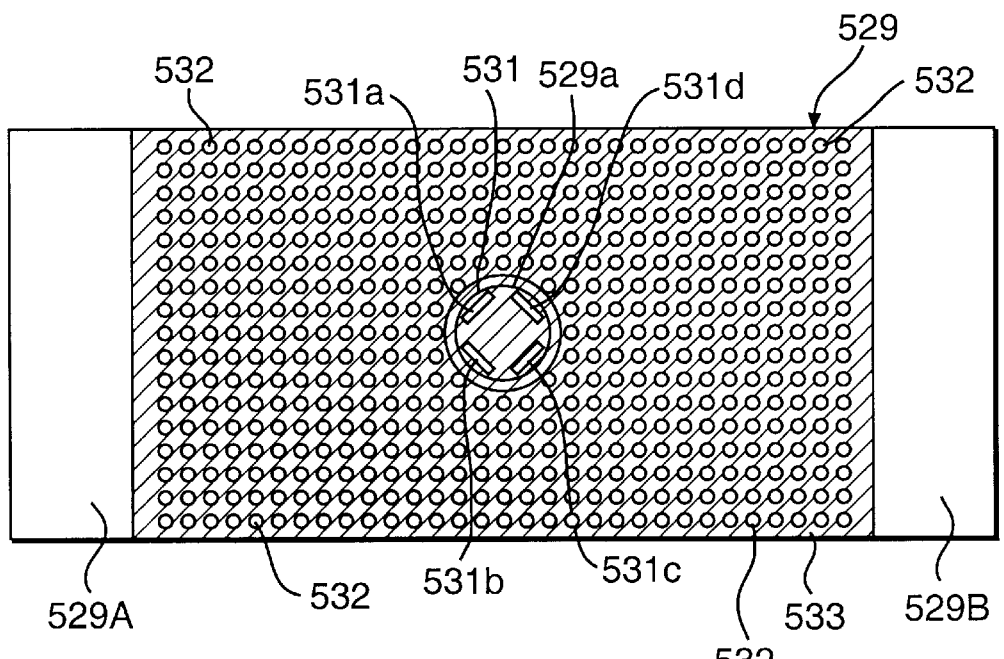
FIG. 31 is a plan view of the plate shown in FIG. 28.

The lens receiving portion 513 which is mounted on the lens receiving table 506 is made up of the plate 529 and the lens receiving cylinder 530. The plate 529 is rectangular in shape, as shown in FIG. 31, and the plate 529 is anchored to the stepped mounting hole 512 of the lens receiving table 506.

The plate 529 is provided with an annular lens-receiver mounting groove 529a at the central portion thereof. The lens receiving cylinder 530 is provided with a transparent cover glass 530a for dust protection.

The plate 529 is provided with a center pattern 531 inside the annular groove 529a. The center pattern 531 is formed by four slit holes 531a through 531d. The center pattern 531 presents a square shape as a whole by these slit holes 531a through 531d. The end edges of the slit holes 531a through 531d are spaced from one another. The plate 529 is formed with regularly spaced peripheral patterns 532 outside the annular groove 529a. These peripheral patterns 532 consist of circular holes, and the center pattern 531 and the peripheral pattern 532 are different in pattern shape. The remaining portion of the plate 529 constitutes a light shutting-off portion 533, and the plate 529 has a function as a pattern forming plate. Also, both predetermined regions of the plate 529 consist of transparent portions 529A and 529B. In the case where a framed eyeglass lens is mounted on the lens receiving cylinder 530, the lens frame is projected on the transparent portions 529A and 529B.

Figure 32:
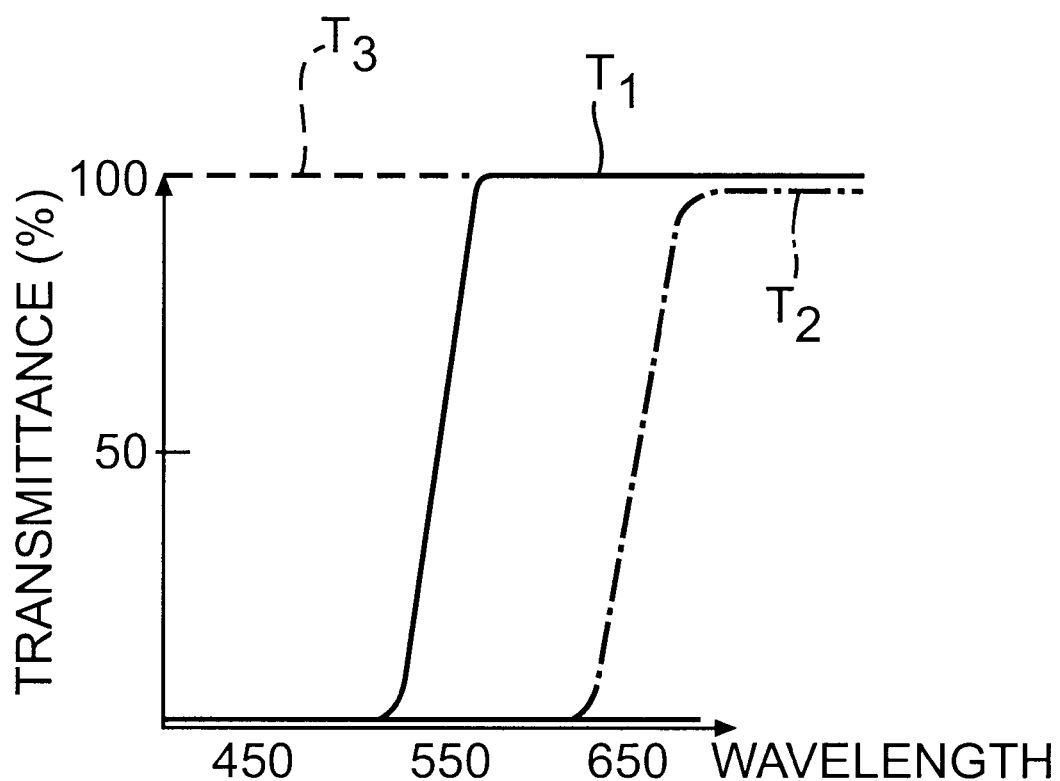
FIG. 32 is a transmittance curve diagram showing the transmission characteristics of the patterns formed in the pattern forming plate shown in FIG. 29.

The center pattern 531 has a transmittance curve which transmits a measuring light beam of wavelength 550 nm or more, as indicated by reference character T1 in FIG. 32, and the peripheral pattern 532 has a transmittance curve which transmits a measuring light beam of wavelength 660 nm or more, as indicated by reference character T2 in FIG. 32.

Figure 33:
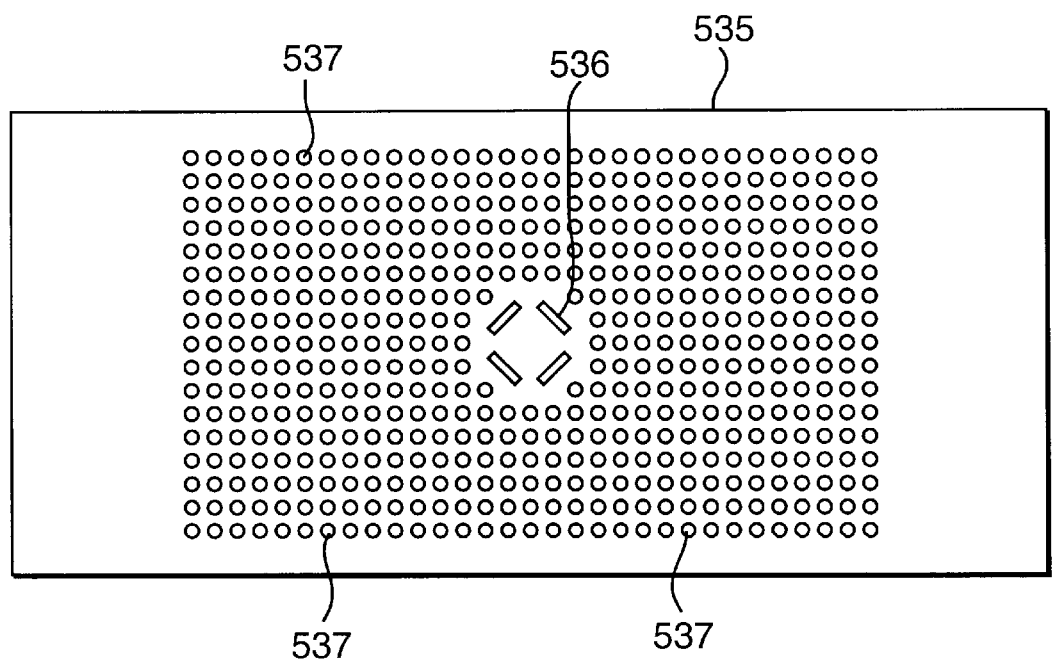
FIG. 33 is an explanatory diagram showing the images of the patterns projected on a screen when an eyeglass lens has not been set on an optical projected-light path.

Here, assume that an unprocessed lens with negative power has been set as an eyeglass lens 534 on the lens receiving portion 513. On the optical projected-light path 527, a screen 535 is provided at a position of predetermined distance from the eyeglass lens 534. This screen 535 consists, for example, of a diffusing plate. When the eyeglass lens 534 has not been set in the optical projected-light path 527, the measuring light beam, as it is the collimated light beam P, is guided to the plate 529 and transmitted through the patterns of this plate 529. Therefore, based on the transmitted measuring light beam, patterns corresponding to the plate 529 are projected onto the screen 535, as shown in FIG. 33. In the figure, 536 denotes a center pattern image on the screen 535 corresponding to the center pattern 531, and 537 a peripheral pattern image on the screen 535 corresponding to the peripheral pattern 532.

Figure 34:
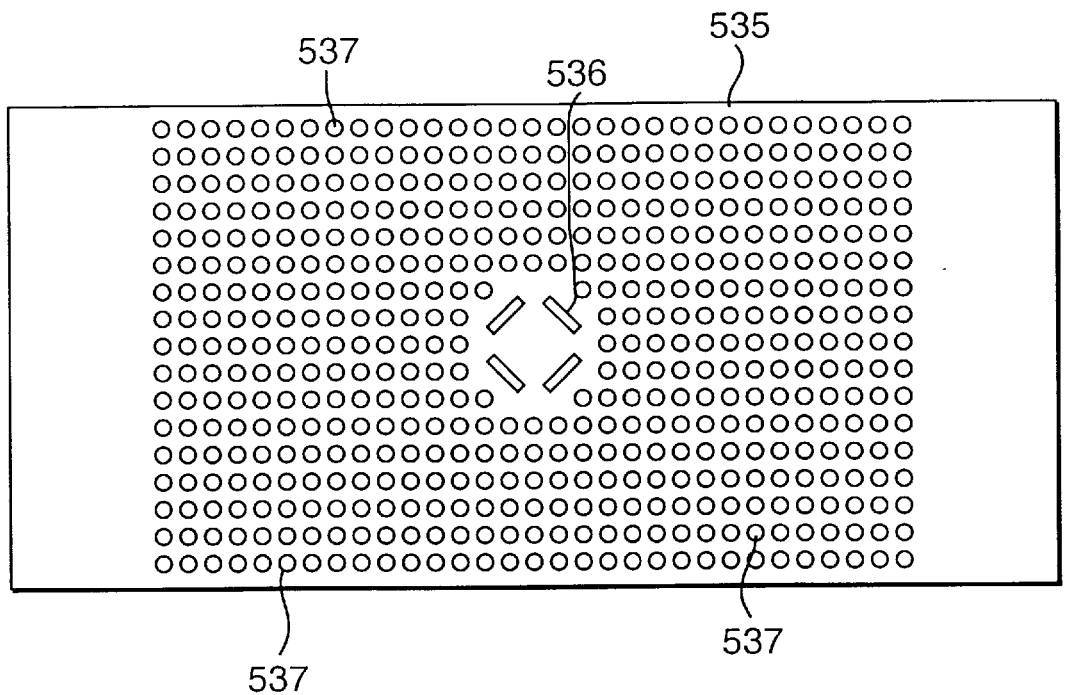
FIG. 34 is an explanatory diagram showing an example of the pattern images that are projected on a screen when an eyeglass lens with negative power is set on the optical projected-light path.
Figure 35:
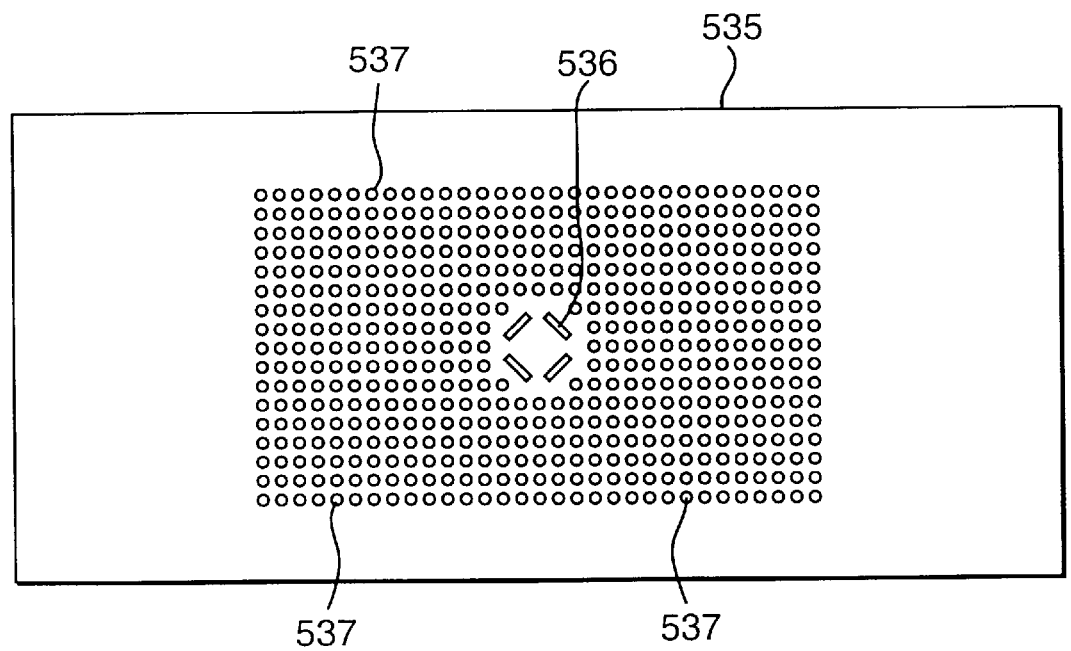
FIG. 35 is an explanatory diagram showing an example of the pattern images that are projected on the screen when an eyeglass lens with positive power is set on the optical projected-light path.

If the eyeglass lens 534 is set in the optical projected-light path 527, then the wide region S1 of that eyeglass lens 534 will be irradiated with the collimated light beam P. The collimated light beam P is subjected to deformation by the negative power of the eyeglass lens 534 and is diffused. Consequently, patterns with widened spacing are projected onto the screen 535, as shown in FIG. 34. If an eyeglass lens with positive power (not shown) is set in the optical projected-light path 527, the collimated light beam P will be subjected to deformation by the positive power of the eyeglass lens 534 and converged. Consequently, patterns with narrowed spacing are projected onto the screen 535, as shown in FIG. 35.

Figure 40:
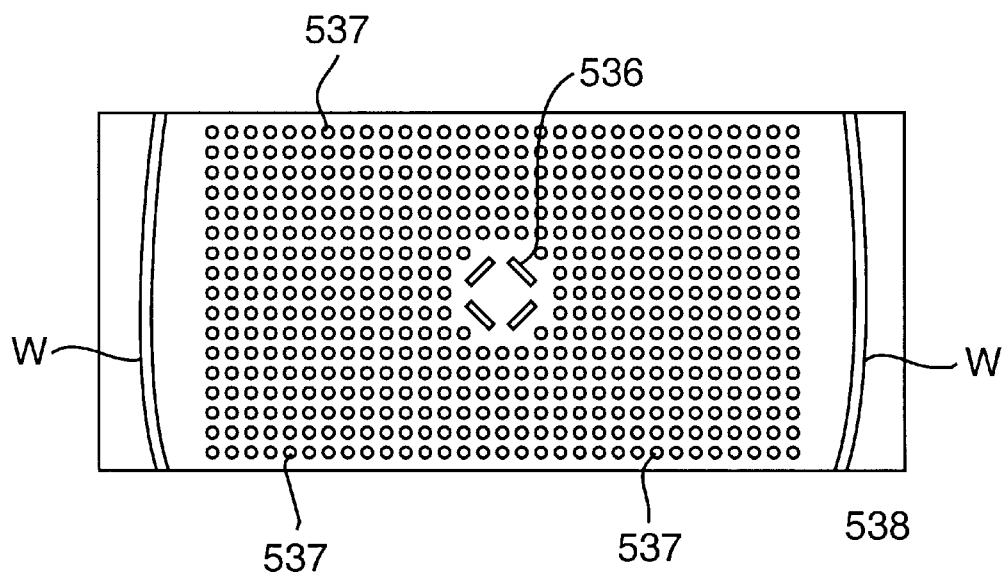
FIG. 40 is an explanatory diagram of images that are projected on an image pick-up device.

On the optical projected-light path 527, an image pick-up device 538 is provided behind the screen 535 at a position which is conjugate with the screen 535 with respect to the image forming lens 539. As shown in FIG. 40, the patterns of the plate 529 and the frame Fb projected on the screen 535 will be imaged on the image pick-up device 538.

The image pick-up device 538 is connected to an arithmetic processing unit 540 constituted by a CPU, etc. And, the light receiving system 580 comprises the plate 529, the screen 535, the image forming lens 539, and the image pick-up device 538. Reference character 570a is the optical axis of the optical measurement system and passes through the center of the image pick-up device 538.

The arithmetic processing unit 540 is equipped with an arithmetic control circuit 541 which computes and processes lens characteristics, a direction of lens movement, and a quantity of movement, first and second memories 542 and 543 which store the computed lens characteristics, and an image processing circuit 544 which generates a distribution image based on the lens characteristics stored on the first and second memories 542 and 543 or generates a frame image from the frame shape data read by a frame reader 560. The arithmetic processing unit 540 is further equipped with an image memories 545 and 546 which store the distribution image generated by the image processing circuit 544, inverted-image memory (first storage means) 547, a second image memory (second storage means) 548, and frame image memory 549 which stores the frame image. The distribution images stored on the image memories 545 through 548 and the frame image stored on the frame image memory 549 are displayed on the display section 503 by manipulation of the key switches K. Also, the frame image can be moved on the display section 503 by manipulation of key switches K. Reference numeral 590 is a frame reader.

The operation of the lens meter of the aforementioned embodiment will next be described. Here, the case where the right eyeglass lens is broken down will be described as an example.

Figure 36:
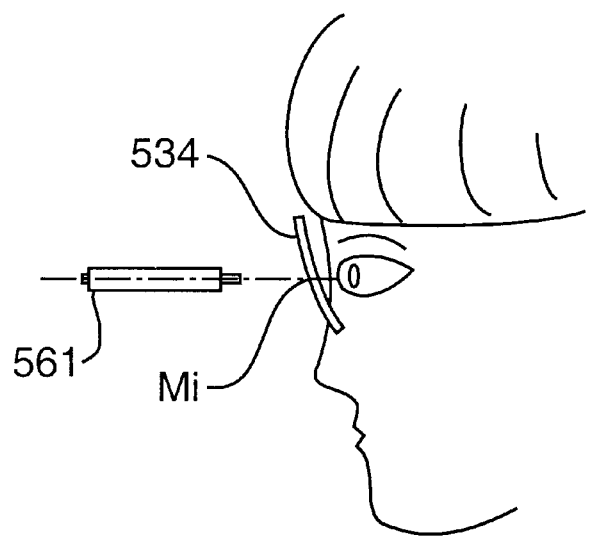
FIG. 36 is an explanatory diagram showing a method of placing an eyepoint mark.
Figure 37:
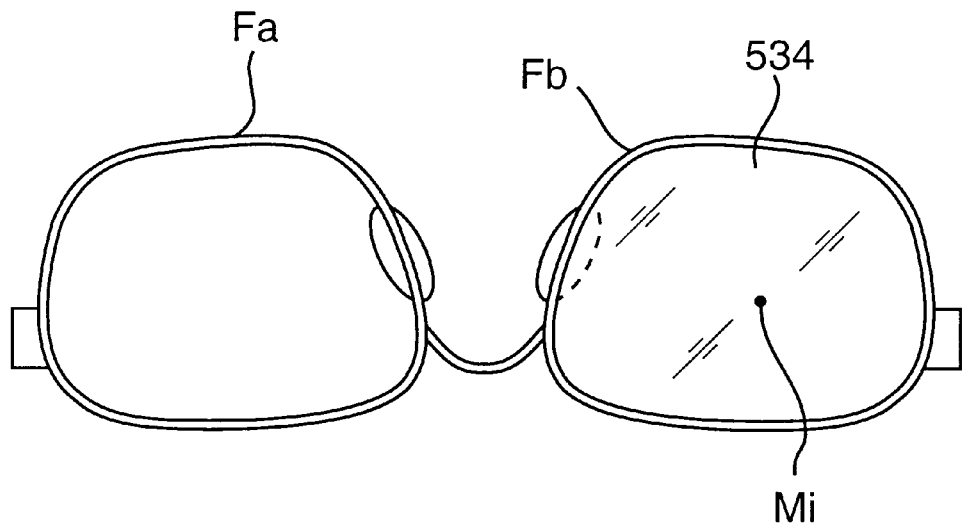
FIG. 37 is an explanatory diagram showing the eyeglass lens with the eyepoint mark.

Initially, as shown in FIG. 36, the subject is allowed to wear the eyeglasses and look in a forward direction, and an eyepoint mark Mi is put on the eyeglass lens (left lens) 534, which is not broken down, by a pen 561 at a position corresponding to the pupil when the subject looks to the front thereof. The eyeglass lens 534 with the eyepoint mark Mi, as shown in FIG. 37, is mounted on the lens receiving cylinder 530 along with the frame Fb, as shown in FIGS. 29 and 30, and the eyepoint mark Mi is aligned with the optical axis of measurement 570a.

This is done, for example, by previously put a mark on the transparent cover glass 530a at a position aligned with the optical axis of measurement 570a and mounting the eyeglass lens 534 on the lens receiving cylinder 530 so that the mark and the eyepoint mark Mi are aligned with each other. Alternatively, a spot light beam is projected along the optical axis of measurement 570a, and the eyeglass lens 534 is mounted on the lens receiving cylinder 530 so that the eyepoint mark Mi comes onto this spot light beam.

If the eyepoint mark Mi and the optical axis of measurement 570a are aligned with each other, then the lens pad table 507 will be brought into contact with the frames Fa and Fb. Next, set a mapping mode by manipulating the switch S1.

With this mapping mode, the LED 522 is driven for a constant time and peripheral pattern images 537 are projected on the screen 535. The peripheral pattern images 537 based on the measuring light beam transmitted through the wide region S1 of the eyeglass lens 534 are received by the image pick-up device 538. The arithmetic circuit 541 of the arithmetic processing unit 540 computes lens characteristics at the positions of measurement on the wide region S1 of the eyeglass lens 534, based on the light receiving signal of the image pick-up device 538, and the computed lens characteristics are stored on the first memory 542. Note that the lens characteristics mean the spherical degree S, the cylindrical degree C, the axial angle degree A, the prismatic degree Prs, and so on.

The image processing circuit 544 generates distribution images of equal degree lines, such as a spherical degree S, a cylindrical degree C, an axial angle degree A, and a prismatic degree Prs, as shown in FIGS. 38(A) through 38(D), based on the lens characteristics stored on the first memory 542, and stores the generated distribution images on the first image memory 545. Note that reference characters "d1" through "dn" in FIG. 38(A) denote equal-degree lines of a spherical degree.

Figure 38A:
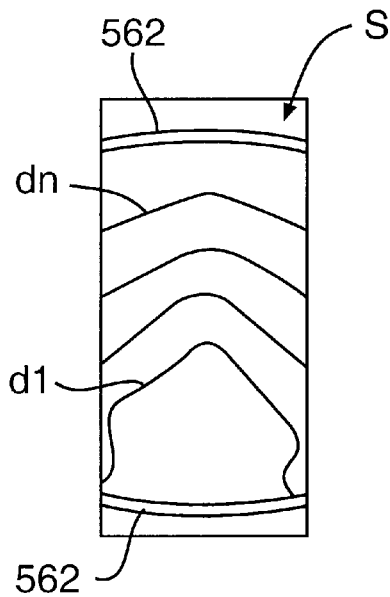
FIG. 38(A) shows an example of a mapping diagram for each lens characteristic value of an eyeglass lens, a spherical degree distribution being shown.
Figure 38B:
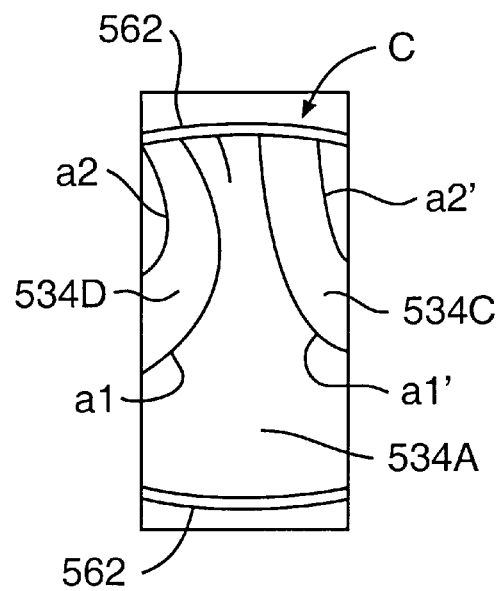
FIG. 38(B) shows a cylindrical degree distribution.
Figure 38C:
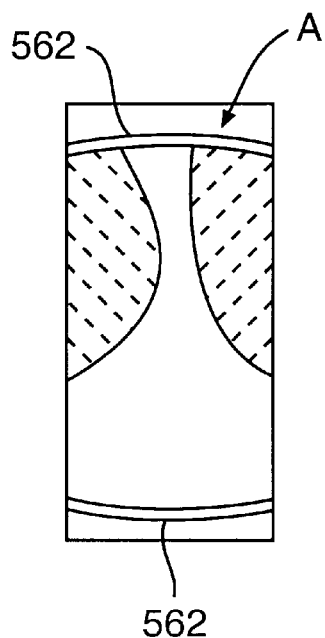
FIG. 38(C) shows an axial angle degree distribution.
Figure 38D:
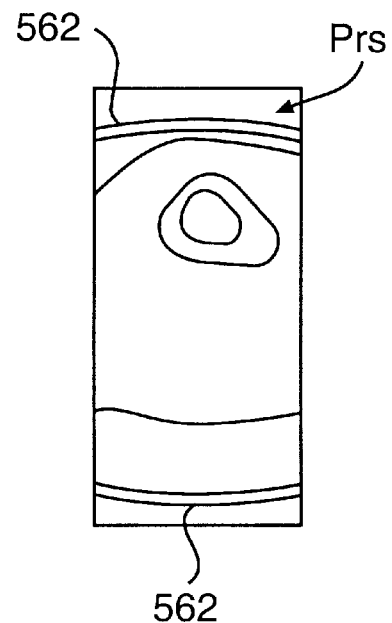
FIG. 38(D) shows a prismatic degree distribution.
Figure 39:
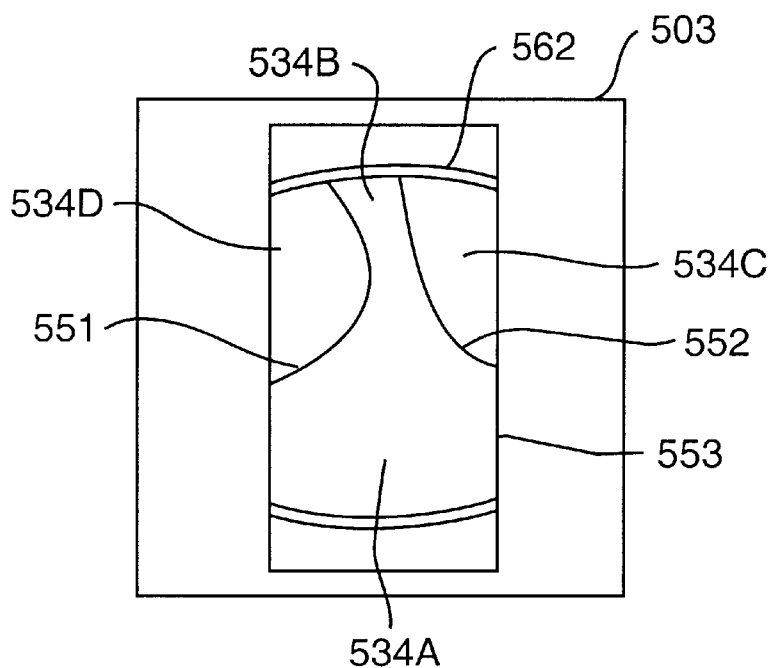
FIG. 39 is an explanatory diagram showing the boundary lines of the progressive band of a subject lens.

Furthermore, the image processing circuit 544 obtains the distance portion 534A of the subject lens 534, a progressive portion 534B continuous to the distance portion 534A, a boundary line 651 between the progressive portion 534B and a region 534C on the left side of the progressive portion 534B, and a boundary line 552 between the progressive portion 534B and a region 534D on the right side of the progressive portion 534B, as shown in FIG. 39, from the distribution image shown in FIG. 38(B).

Also, reference numeral 562 shown in FIGS. 38 and 39 is the image of the lens frame Fb (lens frame image). Thus, since the image of the lens frame Fb can be displayed on the display section 503 alone with the distribution image of the lens characteristics, the corresponding relationship between the lens frame and the distribution image is known.

The boundary lines 551 and 552 uses the equal degree lines a1 and a1' of the equal degree lines a1, a2 . . . , a1', a2' . . . , of a cylindrical shaft shown in FIG. 38(B). The characteristic value of the cylindrical refraction of the distance portion 534A is subtracted from the characteristic value of the cylindrical refraction of each position of the equal degree lines a1 and a1', and portions where this subtracted refractive characteristic value has, for example, a value of 0.25 are taken to be boundary lines 551 and 552.

Thus, the boundary lines 551 and 552 can be clearly expressed by subtracting the characteristic value of the cylindrical refraction of the distance portion 534A. In this connection, in the case where subtraction is not performed, if the spherical degree of the subject lens 534 is large, the equal degree lines a1 and a1' will flow right and left, and consequently, it will be difficult to obtain the boundary lines 551 and 552.

As shown in FIG. 39, the distribution image 553 where the boundary lines 551 and 552 are obtained is stored on the image memory 545 and also is displayed on the display section 503. The distribution images of FIGS. 38(A) through 38(D) stored on this image memory 545 can be displayed on the display section 503 by manipulation of the key switches K.

Figure 41:
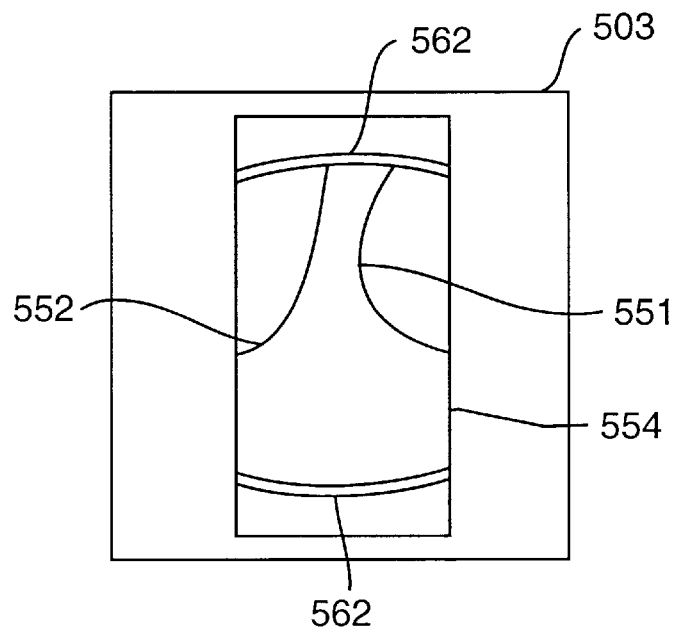
FIG. 41 is an explanatory diagram of an inverted image of the image of FIG. 39.

In the case where the synthesizing and inverting mode has been set by the switch S2, the aforementioned operation is performed and the distribution image 563 shown in FIG. 39 is obtained. Thereafter, the distribution image 553 and the image 562 are inverted right and left and stored as an inverted image on the inverted-image memory 547, and the inverted image 554 is displayed on the display section 503, as shown in FIG. 41.

With display of this inverted image 554, the direction of the progressive band of a damaged eyeglass lens can be directly viewed, and it becomes easy to visually grasp that direction.

Figure 42:
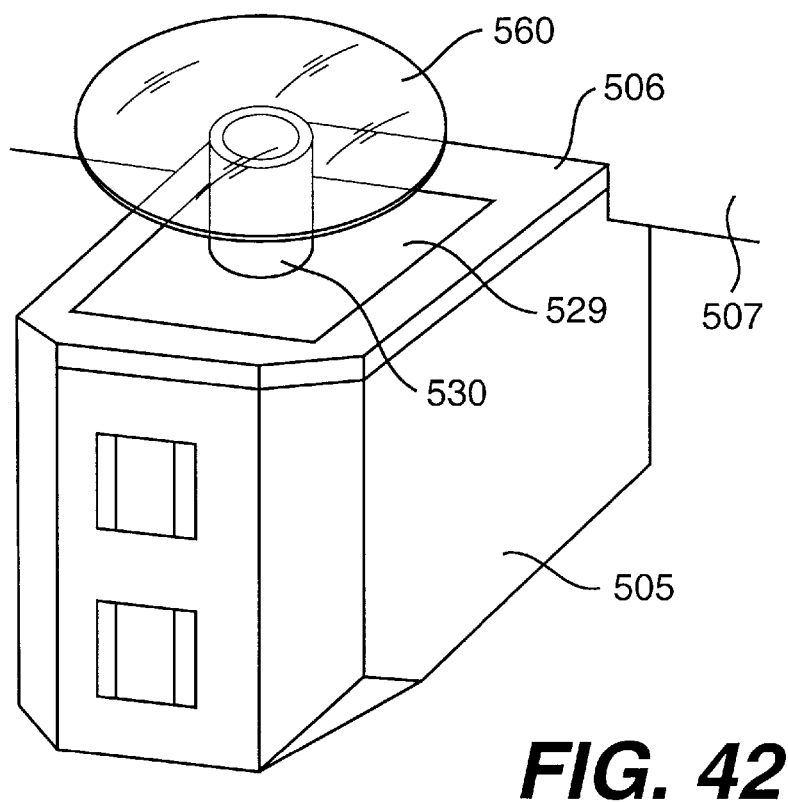
FIG. 42 is a perspective view showing a state where an unprocessed lens is mounted on a lens receiving cylinder.

If the inverted image 554 is displayed on the display portion 503, the eyeglass lens 534 will be removed from the lens receiving portion 530. The unprocessed lens 560 selected based on the processed data is mounted on the lens receiving portion 530, as shown in FIG. 42, and the key switch K is manipulated. With manipulation of this key switch K, the LED 522 is driven. In the same way as the aforementioned, the lens characteristics of the unprocessed lens 560 are computed, and the lens characteristics are stored on the second memory 543.

Figure 43:
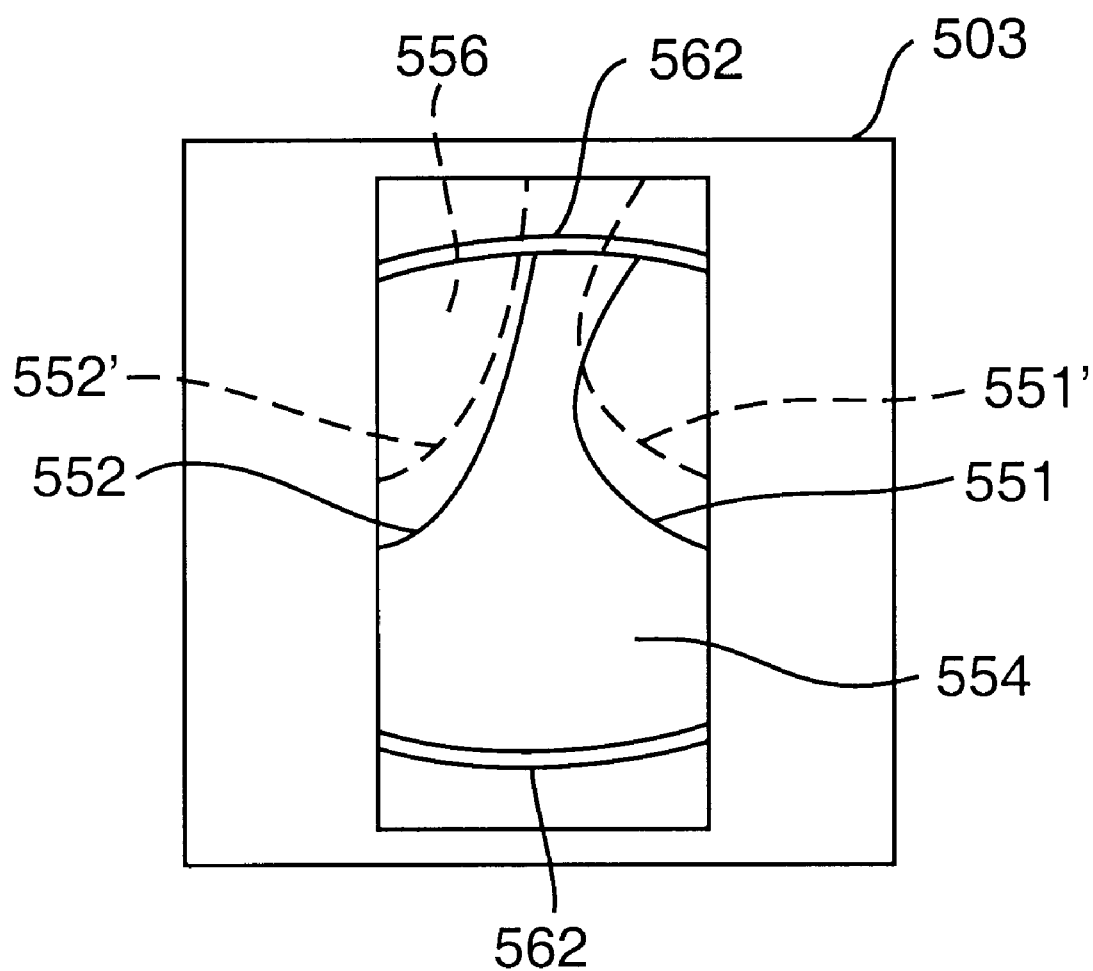
FIG. 43 is an explanatory diagram showing a state where a distribution image for the unprocessed lens and an inverted image are superimposed upon each other.

The image processing circuit 544 generates distribution images of equal degree lines, such as a spherical degree S, a cylindrical degree C, an axial angle degree A, and a prismatic degree Prs, in the same way as those shown in FIGS. 38(A) through 38(D), based on the lens characteristics stored on the second memory 543, and stores the generated distribution images on the image memory 546. Furthermore, the image processing circuit 544 generates a distribution image 556 in which boundary lines 551' and 552' are obtained, as shown in FIG. 43, in the same as the aforementioned. This distribution image 556 is stored on the second memory 548. This distribution image 556 is superimposed on the inverted image 554 and displayed on the display portion 503.

Note that the distribution images stored on the image memory 546 can be displayed on the display section 503 by manipulation of the key switches K.

If the distribution image 556 is superimposed on the inverted image 554 and displayed on the display section 503, driving of the LED 522 will be stopped and the LED 521 will be driven. The center pattern image 536 alone is projected on the screen 535, and only the center pattern image 536 based on the measuring light beam transmitted through the narrow region of the eyeglass lens 534 is received by the image pick-up device 538. Then, while viewing the display section 503, the unprocessed lens 560 is moved so that the boundary lines 551' and 552' of the image 556 are superimposed on the boundary lines 551 and 552 of the inverted image 554.

The arithmetic processing circuit 541 computes the direction of movement and the quantity of movement of the unprocessed lens 560, based on the center pattern image 536 received by the image pick-up device 538. Based on the computed direction of movement and quantity of movement, the distribution image 556 displayed on the display section 503 is moved.

Figure 44:
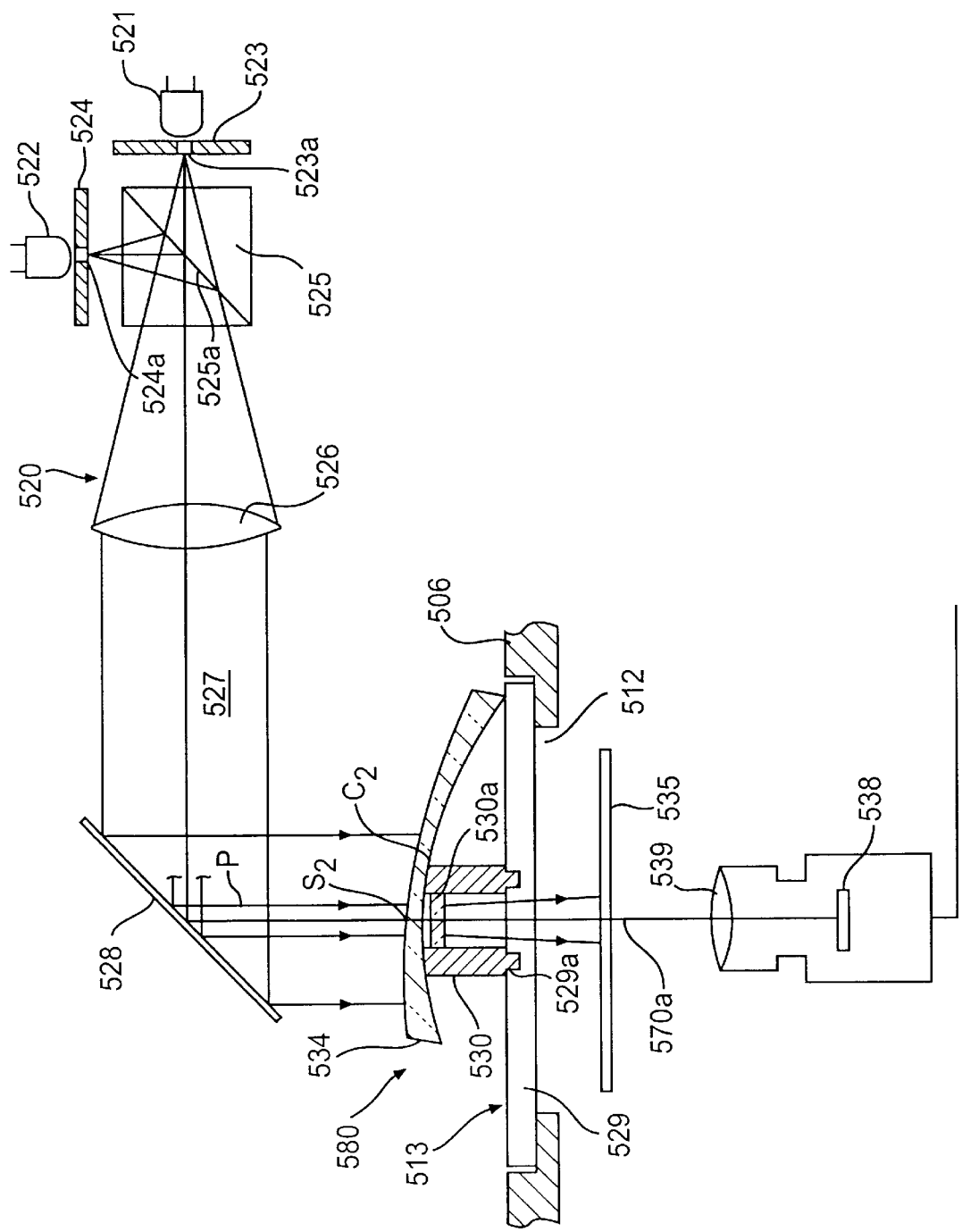
FIG. 44 is an explanatory diagram showing a state where the unprocessed lens mounted on the lens receiving cylinder has been moved.

Here, the quantity of movement is computed based on the prismatic quantity Prs. The following Prentice's formula is employed for computation of this prismatic quantity.

$$X = 10 \cdot Prs/S$$

where X is the offset quantity from the geometrical center C2 (see FIG. 44) of the eyeglass lens 534, Prs is the prismatic quantity, and S is the degree.

Because the prismatic quantity Prs at each of the positions of measurement of the wide region S1 has been obtained with the first measurement, the quantity of movement of the eyeglass lens 534 will be known if compared with the current prismatic quantity at the position S2 of measurement of the narrow region. Also, based on the direction of movement of the center pattern image 536, the direction of movement of the eyeglass lens 534 is obtained. This computation is based on the measurement of the narrow region alone, so that it can be processed at high speed and the distribution image 556 can be moved with real time.

Figure 45:
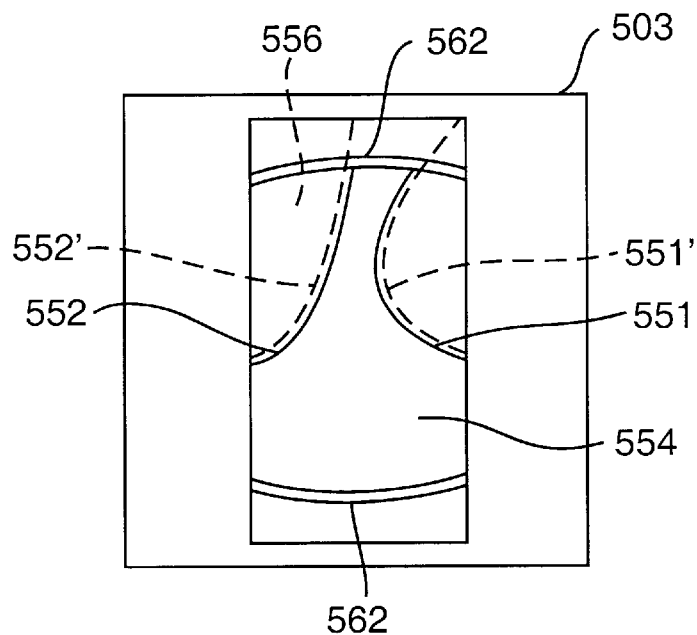
FIG. 45 is an explanatory diagram showing a state where the boundary lines of an inverted image and the boundary lines of the distribution image of an unprocessed lens are aligned with each other.

In addition, as shown in FIG. 45, the boundary lines 551' and 552' of the distribution image 556 and the boundary lines 551 and 552 of the inverted image 554, which have been displayed on the display section 503, are superimposed with each other, and it is confirmed whether or not the width and length of the progressive band of the unprocessed lens 560 are the same as the width and length of the progressive band of the eyeglass lens 534 and also it is confirmed whether the image 562 of the lens frame Fb does not protrude from the distribution image 556 of the unprocessed lens 560.

In the case where the width and length of the progressive band of the unprocessed lens 560 are not the same as those of the eyeglass lens 534 or in the case where the image 562 of the lens frame Fb protrudes from the distribution image 556, the unprocessed lens 560 is exchanged for another unprocessed lens based on processing data and the confirming operations are performed in the same way.

Thus, since the boundary lines 551' and 552' of the distribution image 556 and the boundary lines 551 and 552 of the inverted image 554 can be superimposed with each other, confirmation of whether or not the width and length of the progressive band of the unprocessed lens 560 are the same as those of a damaged eyeglass lens can be reliably performed. Furthermore, whether or not the image 562 of the lens frame Fb does not protrude from the distribution image 556 of the unprocessed lens 560, that is, whether or not the lens frame Fb protrudes from the unprocessed lens 560 can be confirmed, so judgment of processing advisability of an unprocessed lens can be performed.

Figure 46:
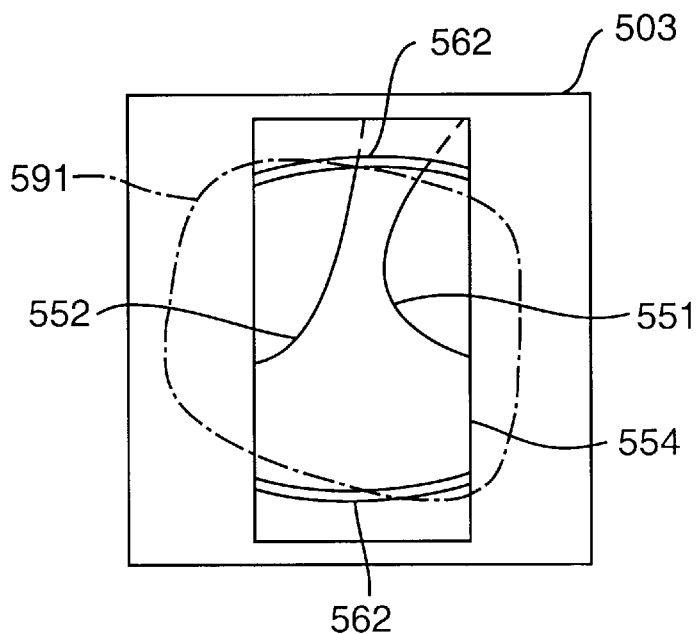
FIG. 46 is an explanatory diagram showing a state where a frame image is superimposed on the image in which a distribution image and an inverted image are superimposed.

If the widths and lengths of the progressive bands of the unprocessed lens 560 and the eyeglass lens 534 are the same as shown in FIG. 45 and if the image 562 of the lens frame Fb does not protrude from the distribution image 556, the shape data of the lens frame Fb read by the frame reader 590 will be read in. If the shape data is read in, then the image processing circuit 544 will generate the frame image 591 of the same shape as the lens frame Fb, based on the shape data, and store it on the frame image memory 549. In addition, as shown in FIG. 46, the frame image 591 is further superimposed on the image in which the distribution image 556 and the inverted image 554 are superimposed, and is displayed on the display section 503.

Figure 47:
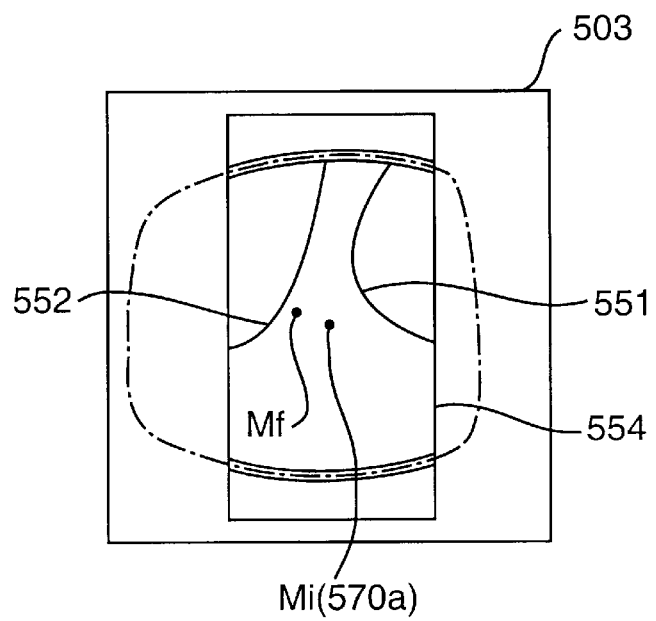
FIG. 47 is an explanatory diagram showing a state where a frame image is aligned with the image of the lens frame of an inverted image.

The subject moves the frame image 591 by key manipulation so that the frame image 591 is superimposed on the image 562 of the lens frame Fb of the inverted image 554, while viewing the display section 503. Then, as shown in FIG. 47, if the image 562 of the lens frame Fb and the frame image 591 are superimposed with each other, the distances in X and Y directions between the geometric center Mf of the lens frame Fb and the eyepoint Mi will be computed by the arithmetic processing circuit 541. That is, the offset quantity (x, y) between the position of the geometric center Mf of the lens frame Fb and the position of the eyepoint Mi is obtained.

This offset quantity (x, y) can be obtained as the position of the geometric center Mf with the position of the eyepoint M1 as the origin (0, 0), because the relation between the shape of the lens frame Fb and the geometric center Mf is known and also the eyepoint Mi has been aligned with the optical axis of measurement 570a and the optical axis of measurement 570a has been aligned with the center of the image pick-up device 538.

The offset quantity may also be obtained from the quantity of movement of the geometric center Mf of the frame image 591 when the geometric center Mf of the lens frame Fb is aligned with the eyepoint Mi and the frame image 591 is displayed on the display portion 503 and when the frame image 591 and the image 562 of the lens frame Fb are superimposed by moving the frame image 591.

In the case where the eyepoint mark Mi is not put on the eyeglass lens 534, the position of a certain optical characteristic value may also be substituted for the eyepoint position. For example, at the eyepoint position of a lens in which a prism shining process is not given, PX=0 and PY=0 (where P is the prismatic quantity), and therefore a portion where the prismatic quantities in X and Y directions are zero can be taken to be an eyepoint position. Even in the case where a prism shining process is given, the position of an eyepoint may also be determined according to addition power on the basis of a portion where the prismatic quantity is zero. For example, when ADD=4D, a portion with PX=0 and PY=2Δ (where Δ is " . . . ") may also be used as the position of an eyepoint.

These eyepoint positions can be obtained with the center position of the image pick-up device 538 as a reference. And, it will be sufficient if the obtained eyepoint positions are displayed on the display section 503.

Figure 50:
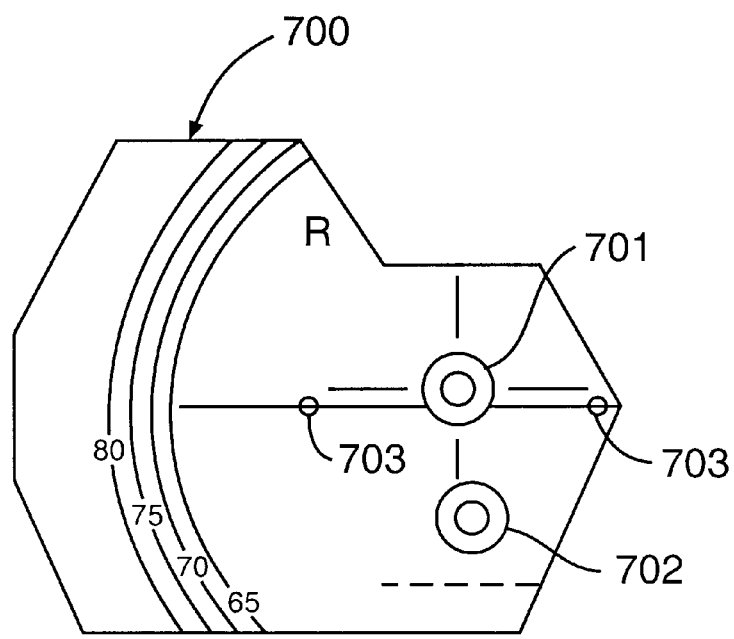
FIG. 50 is an explanatory diagram showing a seal.

Also, as shown in FIG. 50, the positions of eyepoints may also be obtained by employing a seal 700 prepared by each maker. Reference numeral 701 is a mark representative of a far eyepoint, 702 a mark representative of a near eyepoint, and 703 alignment marks which are aligned with hidden marks. The alignment marks 703 of the seal 700 are aligned with the hidden marks (not shown) of the eyeglass lens 534, and then the seal 700 is attached to the eyeglass lens 534. It will be sufficient if the mark 701 for a far eyepoint at this time is used as an eyepoint.

If the offset quantity (x, y) is obtained, marking will be performed with manipulation of the key switches K. Then, this computed offset quantity (x, y) and frame shape data are input to a ball grinding machine (not shown).

On the other hand, if a suction disc (not shown) is attached to the marked position of the unprocessed lens 560 and this unprocessed lens 560 is set to the ball grinding machine and if the unprocessed lens 560 is ground based on the frame shape data and the offset quantity (x, y), then there will be obtainable an eyeglass lens which is exactly the same as the eyeglass lens 534 inverted right and left. If this eyeglass lens is framed in the lens frame Fa, the progressive band of the eyeglass lens will be positioned to the same position as the progressive band of the eyeglass lens 534 and also the directions of the progressive bands will become symmetrically right and left of each other. Also, the positions of the distance portion and the near portion become the same position.

That is, in the state where the position and direction of the progressive band of an eyeglass lens and the positions of the distance portion and near portion are exactly the same as those of a damaged eyeglass lens, the eyeglass lens can be framed into the lens frame Fa and will become sufficiently satisfactory when the subject wears the framed eyeglasses.

In the aforementioned embodiment, while the distribution image 556 has been superimposed on the inverted image 554 and displayed on the display section 503, the images 556 and 554 may also be displayed in a row on the display section 503. Also, although the distribution image 553 showing the boundary lines 551 and 552 which indicate the boundaries of the progressive band has been inverted and displayed, the distribution images shown in FIGS. 10(A) through 10(D) may also be inverted and displayed.

Ninth Embodiment

In the eighth embodiment, while the offset quantity (x, y) between the position of the geometric center Mf of the lens frame Fb and the position of the eyepoint Mi has been obtained by displaying the frame image 591 on the display section 503 and moving this frame image 591, it may also be obtained by making use of the lens pad table 7 and the slider 9a. In this case, the operation from the application of the eyepoint mark Mi to the eyeglass lens 534 to the judgment of the layout of the superimposition of the distribution image 556 and the inverted image 554 is the same as the eighth embodiment.

Figure 48:
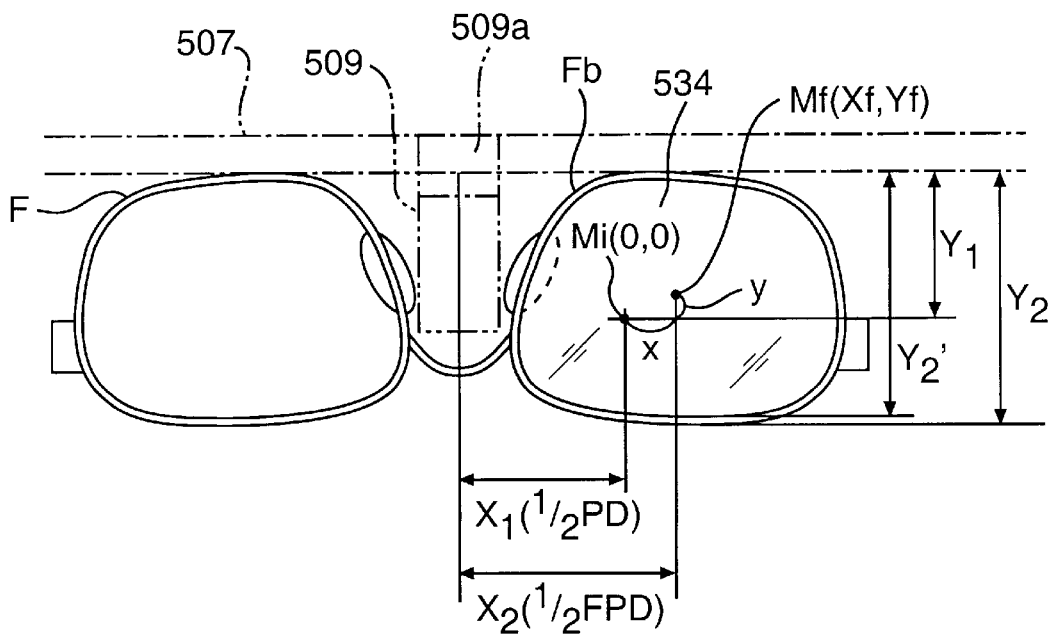
FIG. 48 is an explanatory diagram showing another example of the method of obtaining an offset quantity between the position of the geometric center of the lens frame and the position of an eyepoint.

The offset quantity (x, y) in this case, as shown in FIG. 48, is obtained from x=X2−X1 and y=Yi−1/2(Y2), and X1 and Y1 are obtained from the quantities of movement of the slider 509a and the lens pad table 507. X2 and Y2 are obtainable by the frame reader 590. In the case of obtaining Y2, a value of Y2' inside the lens frame Fb is measured by the frame reader 590, and this value Y2' is corrected to obtain Y2. For this correction, for example, 0.5 mm is added to Y2' when the lens frame is a metal frame and 2 mm is added when the lens frame is a cell frame.

Figure 49:
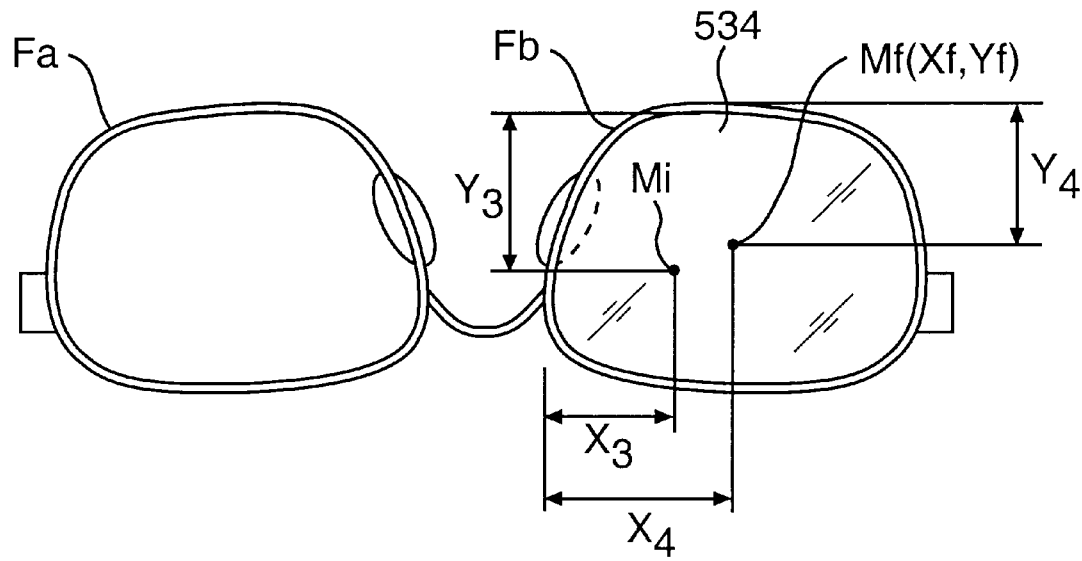
FIG. 49 is an explanatory diagram showing a method of obtaining an offset quantity between the position of the geometric center of the lens frame and the position of an eyepoint with a ruler.

Additionally, as shown in FIG. 49, X3 and Y3 can be directly obtained by a ruler and X4 and Y4 can be obtained with the frame reader 590, so that the offset quantity (x, y) can be obtained with x=X4×X3 and y=Y3×Y4.

As has been described hereinbefore, the present invention can obtain the corresponding relationship between the lens frame of a subject lens and the distribution state of the lens characteristics of the subject lens.

What is claimed is:

1. A layout judgment apparatus comprising:
measurement means for measuring a lens characteristic at each portion of a progressive power lens; and
a display section for displaying an image which shows a distribution of the lens characteristics at the portion of said progressive power lens
wherein a lens frame image showing a shape of a lens frame is displayed on said display section.

2. The layout judgment apparatus as set forth in claim 1, wherein said lens frame image shows part of an upper portion of the lens frame and part of a lower portion of the lens frame.

3. A layout judgment apparatus, comprising a display section capable of displaying an image synthesized by superimposing an image of a subject lens showing a refractive power distribution or an astigmatism distribution, an image of a lens frame and a mark image at a predetermined position with respect to the image of said lens frame, based on refractive power distribution data or astigmatism distribution data of said subject lens, frame shape data of said lens frame, and eyepoint data of a subject.

4. The layout judgment apparatus as set forth in claim 3, wherein said mark image is an eyepoint mark image showing an eyepoint.

5. The layout judgment apparatus as set forth in claim 4, wherein an external shape of a suction disc attached to said subject lens by suction is superimposed and displayed on said synthesized image.

6. A layout judgment system for a subject lens, comprising:
lens data input means for inputting refractive power distribution data or astigmatism distribution data of the subject lens measured by a lens meter;
frame data input means for inputting frame shape data of a lens frame measured by a frame shape measurement apparatus;
eyepoint data input means for inputting eyepoint data relative to said lens frame, said eyepoint data having been measured by eyepoint detection means; and
image display means capable of displaying an image synthesized by superimposing an image of the subject lens showing a refractive power distribution or an astigmatism distribution, an image of said lens frame and an eyepoint mark image at an eyepoint position relative to the image of said lens frame, based on the refractive power distribution data or the astigmatism distribution data, the frame shape data, and the eyepoint data.

7. The layout judgment system as set forth in claim 6, further including storage means for storing data of an external shape of a suction cup disc attached to said subject lens by suction, said external shape being superimposed on said synthesized image and displayed by said image display means.

8. A layout judgment system for a subject lens, comprising:
a lens meter for measuring a refractive power distribution or an astigmatism distribution of the subject lens;
a frame shape measurement apparatus for measuring a frame shape of a lens frame;
an eyepoint measurement apparatus for measuring an eyepoint of a subject relative to said lens frame; and
image display means connectable to said lens meter, said frame shape measurement apparatus and said eyepoint measurement apparatus, said image display means capable of displaying an image synthesized by superimposing an image of the subject lens showing the refractive power distribution or the astigmatism distribution, an image of said lens frame and an eyepoint mark image at an eyepoint position relative to the image of said lens frame.

9. The layout judgment system for a subject lens as set forth in claim 8, wherein said lens meter has:

three-dimensional shape measurement means for measuring three-dimensional shapes of both sides of said subject lens;

degree measurement means for measuring a degree of said subject lens at a reference position of said subject lens;

lens thickness measurement means for measuring a thickness of said subject lens at said reference position; and refractive index computation means for measuring a refractive index of said subject lens from measurement results obtained by said three-dimensional shape measurement means, said degree measurement means, and said lens thickness measurement means.

10. The layout judgment system for a subject lens as set forth in claim 8, wherein said frame shape measurement apparatus has a shape measuring section for measuring an external shape of a rimless lens for demonstration.

11. A layout judgment system for a subject lens, comprising:

a lens meter for measuring a refractive power distribution or an astigmatism distribution of said subject lens;

a frame shape measurement apparatus for measuring a frame shape of a lens frame;

data input means for inputting data of an eyepoint position relative to said lens frame; and image display means connectable to said lens meter, said frame shape measurement apparatus, and said data input means, said image display means capable of displaying an image synthesized by superimposing an image of said subject lens showing the refractive power distribution or the astigmatism distribution, an image of said lens frame and an eyepoint mark image at the eyepoint position relative to the image of said lens frame, based on refractive power distribution data or astigmatism distribution data measured by said lens meter, frame shape data measured by said frame shape measurement apparatus, and eyepoint data input by said data input means.

12. A layout judgment apparatus for measuring a lens characteristic of a subject lens mounted on a measuring section, the layout judgment apparatus, comprising a display section for displaying a distribution image showing a measured lens characteristic and an image of an eyeglass frame when an eyeglass lens framed in an eyeglass frame is mounted on the measuring section to measure the lens characteristics and said display section displays the distribution image and the image of the eyeglass frame by inverting said images right and left in an inverted mode.

13. The layout judgment apparatus as set forth in claim 12, wherein, when an unprocessed lens is mounted on said measuring section after completion of measurement of said eyeglass lens and lens characteristics of the unprocessed lens are measured, a distribution image of the lens characteristics of the unprocessed lens is displayed on said display section along with said inverted image.

14. A layout judgment apparatus having light projection means for projecting a measuring light beam onto a subject lens mounted on a measuring section and measurement means for measuring lens characteristics of portions of said subject lens based on the measuring light beam transmitted through said subject lens, the layout judgment apparatus, comprising:

first storage means for storing a distribution image of the lens characteristics and a lens frame image showing part of at least upper and lower portions of said lens frame when an eyeglass lens framed in an eyeglass frame is mounted on said measuring section and lens characteristics are measured;

a display section for displaying the distribution image and the lens frame image stored in said first storage means; and second storage means for storing a distribution image showing lens characteristics of an unprocessed lens when the unprocessed lens is mounted on said measuring section after measurement of said eyeglass lens and the lens characteristics of the unprocessed lens are measured; and said display section capable of displaying the distribution image stored in said second storage means, the distribution image stored in said first storage means, and the lens frame image stored in said first storage means.

15. The layout judgment apparatus as set forth in claim 14, wherein said first storage means stores an inverted image of said lens frame image and distribution image being inverted right and left.

16. The layout judgment apparatus as set forth in claim 15, wherein, when the unprocessed lens mounted on said measuring section is relatively moved with respect to said measuring section, the distribution images being displayed on said display section are moved in correspondence with the movement of the unprocessed lens.

17. The layout judgment apparatus as set forth in claim 16, further comprising marking means for putting a mark on the subject lens mounted on said measuring section.

* * * * *